United States Patent
Murakami et al.

(10) Patent No.: US 10,483,776 B2
(45) Date of Patent: Nov. 19, 2019

(54) CHARGER

(71) Applicant: MAKITA CORPORATION, Anjo-Shi (JP)

(72) Inventors: Junichi Murakami, Anjo (JP); Masaya Mizutani, Anjo (JP); Hisakazu Okabayashi, Anjo (JP)

(73) Assignee: MAKITA CORPORATION, Anjo-Shi (JP)

( * ) Notice: Subject to any disclaimer, the term of this patent is extended or adjusted under 35 U.S.C. 154(b) by 37 days.

(21) Appl. No.: 15/920,888

(22) Filed: Mar. 14, 2018

(65) Prior Publication Data

US 2018/0278071 A1    Sep. 27, 2018

(30) Foreign Application Priority Data

Mar. 23, 2017 (JP) ................. 2017-057517

(51) Int. Cl.
*H02J 7/00* (2006.01)
*H01M 10/44* (2006.01)

(52) U.S. Cl.
CPC ......... *H02J 7/0045* (2013.01); *H01M 10/441* (2013.01); *H01M 10/443* (2013.01); *H02J 7/0026* (2013.01)

(58) Field of Classification Search
CPC ....... Y02E 60/12; H02J 7/0042; H02J 7/0045; H02J 7/0044; H02J 7/0003; H02J 7/0013;
(Continued)

(56) References Cited

U.S. PATENT DOCUMENTS

2013/0044002 A1* 2/2013 Schneider ........... H01M 10/441
340/636.2
2013/0271146 A1* 10/2013 Sakabe ................ H02J 7/0016
324/415
(Continued)

FOREIGN PATENT DOCUMENTS

DE    102015002072 A1    8/2016
EP       2670012 A1    12/2013
JP       2015162930 A    9/2015

OTHER PUBLICATIONS

Extended European Search Report from the European Patent Office dated May 24, 2018 in related EP application No. 18163654.9, including European Search Opinion and European Search Report.

*Primary Examiner* — Arun C Williams
(74) *Attorney, Agent, or Firm* — J-TEK Law PLLC; Jeffrey D. Tekanic; Scott T. Wakeman

(57) ABSTRACT

A charger (5) includes connecting parts (31, 32), a main converter (83), charging paths (Cpa, Cpb), switching elements (SWa, SWb), and a charging-control part (200). A first battery (Ba) having a first mounting part (11) and a second battery (Bb) having a second, different mounting part (21) are respectively mountable on the connecting parts (31, 32). The charging paths (Cpa, Cpb) respectively connect the main converter (83) to the connecting parts (31, 32). The switching elements (SWa, SWb) respectively connect or disconnect the charging paths (Cpa, Cpb) to/from the main converter (83). The charging-control part (200) selects one of the batteries (Ba, Bb) as the charging target and sets the charging path, to which the charging target (Ba, Bb) is connected, to the connected state. Then, the charger (5) charges the charging target to a predetermined voltage using a charging current suited to the charging target.

24 Claims, 18 Drawing Sheets

(58) Field of Classification Search
CPC .... H02J 7/0026; H01M 10/46; H01M 10/441; H01M 10/443
See application file for complete search history.

(56) References Cited

U.S. PATENT DOCUMENTS

| | | |
|---|---|---|
| 2014/0266048 A1 | 9/2014 | Cunanan et al. |
| 2015/0244034 A1 | 8/2015 | Taga |
| 2018/0034290 A1 | 2/2018 | Hinterberger et al. |

* cited by examiner

CHARGER

CROSS-REFERENCE

This application claims priority to Japanese patent application serial number 2017-057517, filed on Mar. 23, 2017, the contents of which are incorporated herein by reference in their entirety.

TECHNICAL FIELD

The present disclosure relates to a charger that charges two or more slide-type (slide-mountable) batteries having differing mounting parts.

BACKGROUND ART

Japanese Laid-open Patent Publication 2015-162930 discloses a charger comprising two connecting parts (charging ports) on which two slide-type batteries (battery packs or battery cartridges) having the same mounting part configuration can be mounted at the same time.

SUMMARY OF THE INVENTION

There are multiple types of slide-type batteries having mounting parts that differ in accordance with voltage differences, etc. Even though the charger described in the above-mentioned JP 2015-162930 comprises two connecting parts, it is not configured such that two batteries having differing mounting parts can be mounted on the two connecting parts. Accordingly, users who own multiple batteries having differing mounting parts must purchase and use multiple chargers in order to charge the multiple types of batteries.

An object of the present disclosure is to make it possible to charge, using a single charger, multiple slide-type (slide-mountable) batteries having differing mounting parts.

A charger according to one aspect of the present disclosure comprises a plurality of connecting parts (charging ports), one power supply circuit, a plurality of charging paths, a plurality of open/close parts (e.g. switches), and a charging-control part (e.g., a controller or processor).

At least two slide-type (slide-mountable) batteries (battery packs, battery cartridges) having differing mounting parts are respectively mounted on the plurality of connecting parts. The power supply circuit generates charging power from electric power (e.g., a commercial AC power supply) input to the charger. The charging paths respectively connect the power supply circuit to the plurality of connecting parts. The open/close parts (e.g., switches) are respectively provided in the plurality of charging paths and are configured such that, when the open/close part is in its closed (e.g., conducting) state, the respective charging path is set to its connected state, and when the open/close part is in its open (non-conducting or disconnected) state, the respective charging path is set to its disconnected state.

With regard to the charging-control part, a battery connected to one of the plurality of connecting parts serves as the charging target, the open/close part, from among the plurality of open/close parts, provided in the charging path, which is connected to the charging target via the connecting part, is set to the closed state, and the charging target is charged to a predetermined voltage by a charging current that is suited for the charging target.

In other words, the charging-control part is configured (e.g., programmed) to: (i) set (select) one of the batteries connected to one of the plurality of connecting parts as the charging target, (ii) set the open/close part (from among the plurality of open/close parts), which is in the charging path that connects the power supply circuit to the connecting part having the charging target attached thereto, to its closed (conducting) state, and (iii) then charge the charging target to a predetermined voltage by supplying a charging current that is suited for the charging target.

According to this aspect of the present disclosure, multiple slide-type (slide-mountable) batteries (battery packs) having differing mounting parts can be connected to a single charger at the same time. One battery among the batteries connected to the charger serves as the charging target, the charging path that connects the charging target to the power supply circuit is set to the connected state, and thereby the charging target is charged. If the two or more batteries are connected to the charger, then all the batteries can be charged by sequentially switching the charging target. Accordingly, multiple slide-type batteries having differing mounting parts (e.g., differing rated voltages and/or differing charging parameters) can be charged by one charger.

The charger may further comprise: a branch point at which the plurality of charging paths respectively branch to the plurality of open/close parts; and a plurality of backfeed (reverse-current) prevention parts (circuits) respectively provided between the plurality of connecting parts and the branch point. The backfeed prevention parts are configured to prevent backfeeding (reverse flows) of electric current from the connecting parts to the branch point.

Thereby, when a battery connected to a connection part is not the charging target, backfeeding (reverse flow) of electric current from that battery to the branch point can be prevented by the open/close part being in the open state and by the backfeed prevention part. Thus, by providing the backfeed prevention parts in addition to the open/close parts, safety during charging can be further enhanced.

In addition or in the alternative, the charger may further comprise a diagnostic part that diagnoses (e.g., checks for malfunctions of) the plurality of open/close parts prior to starting the charging of the charging target by the charging-control part.

By diagnosing the plurality of open/close parts prior to the start of charging, charging can be discontinued if any of the open/close parts is malfunctioning, thereby further increasing safety.

In addition or in the alternative, the charging-control part may be configured (e.g., programmed) such that, when at least two batteries are respectively connected to the plurality of connecting parts and the battery temperature of one of those batteries exceeds a preset temperature threshold for that battery, the battery whose battery temperature exceeds its temperature threshold is set to a standby state, and the other battery is charged first (precedently), i.e. prior to the high temperature (overheated) battery.

In this way, if a battery whose battery temperature exceeds its temperature threshold is connected to the charger, then that battery is set to the standby state until its battery temperature falls below the temperature threshold; during that interval (i.e. while the high temperature battery is cooling down to a safe temperature for charging), the other battery is charged first. Thereby, a plurality of battery packs can be charged in an efficient and safe manner.

In addition or in the alternative, the charger may further comprise: a case that houses the power supply circuit, the plurality of charging paths, the plurality of open/close parts, and the charging-control part, wherein the connecting parts are provided on one surface of the case. Furthermore, the case may comprise at least one mounting part provided such that it projects from a surface that differs from the surface on which the connecting parts are provided. In addition, a mating hole configured or adapted to mate with a projection provided on a mounting surface, on which the charger can be mounted, may be formed in the (each) mounting part.

In this aspect of the present disclosure, by mating the mating hole(s) of the mounting part(s) with the projection(s) provided on the mounting surface, the charger can be mounted and used (held for use) on the mounting surface. Furthermore, because the mounting part(s), in which the mating hole(s) is/are formed, is/are provided such that it/they project(s) from the rear surface of the case, such a design better prevents the projection(s) from penetrating (extending or protruding into) the interior of the case than if the mating hole(s) were to be formed in the rear surface of the case. As a result, the space inside the case can be utilized effectively, e.g., to house the circuit board, etc. in a rational manner.

DETAILED DESCRIPTION OF THE EMBODIMENTS

Embodiments of the present invention are explained below, with reference to the drawings. A charger 5 according to one representative, non-limiting embodiment of the present disclosure is configured (adapted) to charge two types of battery packs having differing mounting parts.

1. Mechanical Configuration 1-1. Exterior Configuration

Figure 1:
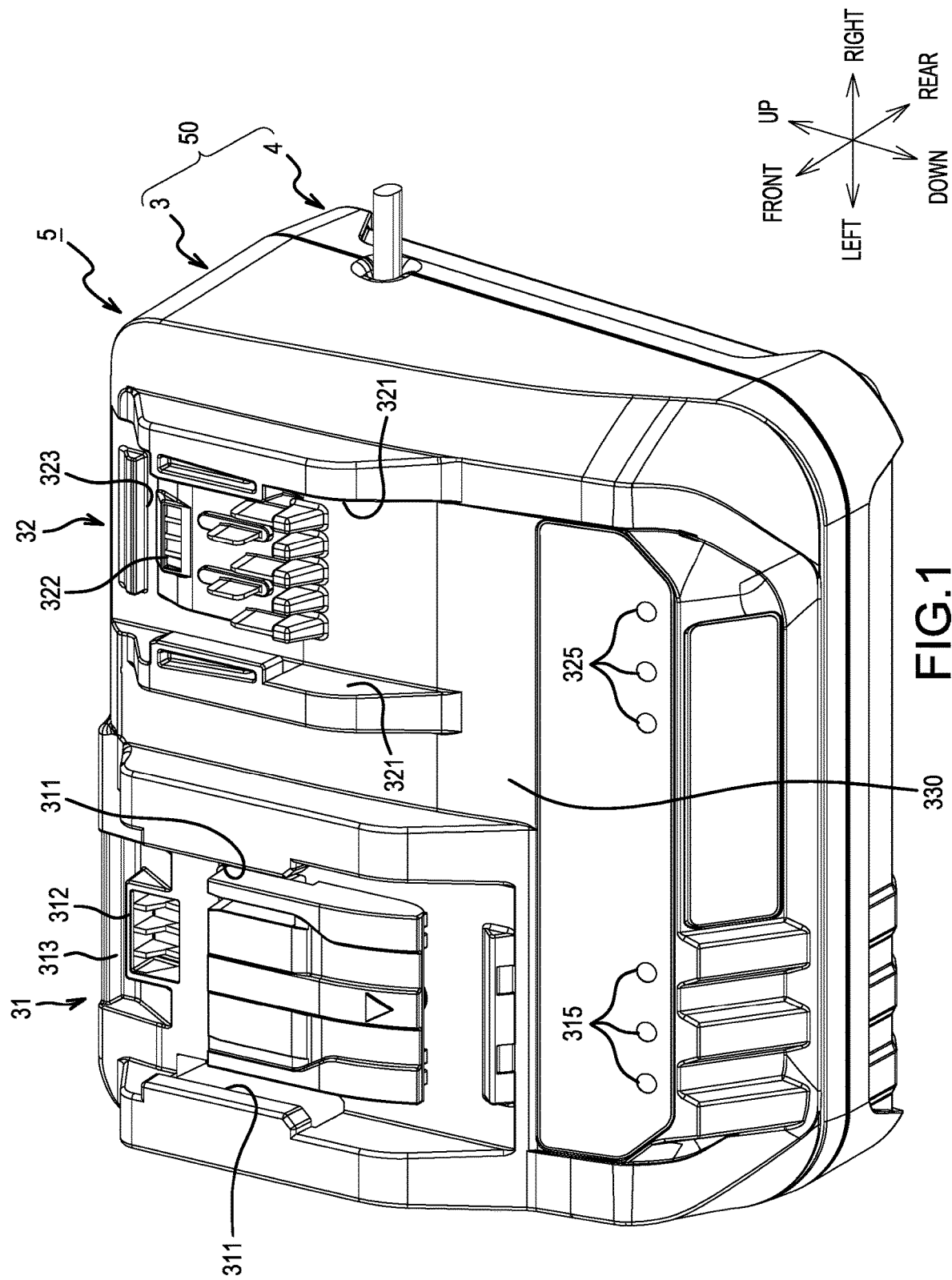
FIG. 1 is an oblique view that shows a front surface of the external appearance of a charger according to the present teachings.

First, the mechanical configuration of the exterior of the representative, non-limiting charger 5 will be explained, with reference to FIGS. 1-5. The charger 5 is configured such that a first connecting part (charging port) 31 and a second connecting part (charging port) 32, which correspond (are complementary) to the mounting parts of two different types of battery packs, are provided on one surface of a case 50, which is a housing made of resin. A circuit board, on which a charging circuit is provided, is housed in the interior portion of the case 50. As shown in FIG. 1, the surface on which the first connecting part 31 and the second connecting part 32 are provided will be defined herein as front surface 330. The surface opposite of the front surface 330 will be defined herein as rear surface 410. According to the directional arrows shown in FIG. 1, the front surface 330 faces the frontward direction and the rear surface 410 faces the rearward direction. In addition, the direction in which the first connecting part 31 and the second connecting part 32 are side-by-side will be defined herein as the left-right direction, and the longitudinal direction of the first connecting part 31 and the second connecting part 32 will be defined herein as the up-down direction.

The first connecting part 31 and the second connecting part 32 are provided on an upper part of the front surface 330 and are arranged on the left and right sides of the charger 5. In addition, the charger 5 comprises a first display part 315, which is provided on the front surface 330 downward of the first connecting part 31, and a second display part 325, which is provided on the front surface 330 downward of the second connecting part 32.

Figure 2:
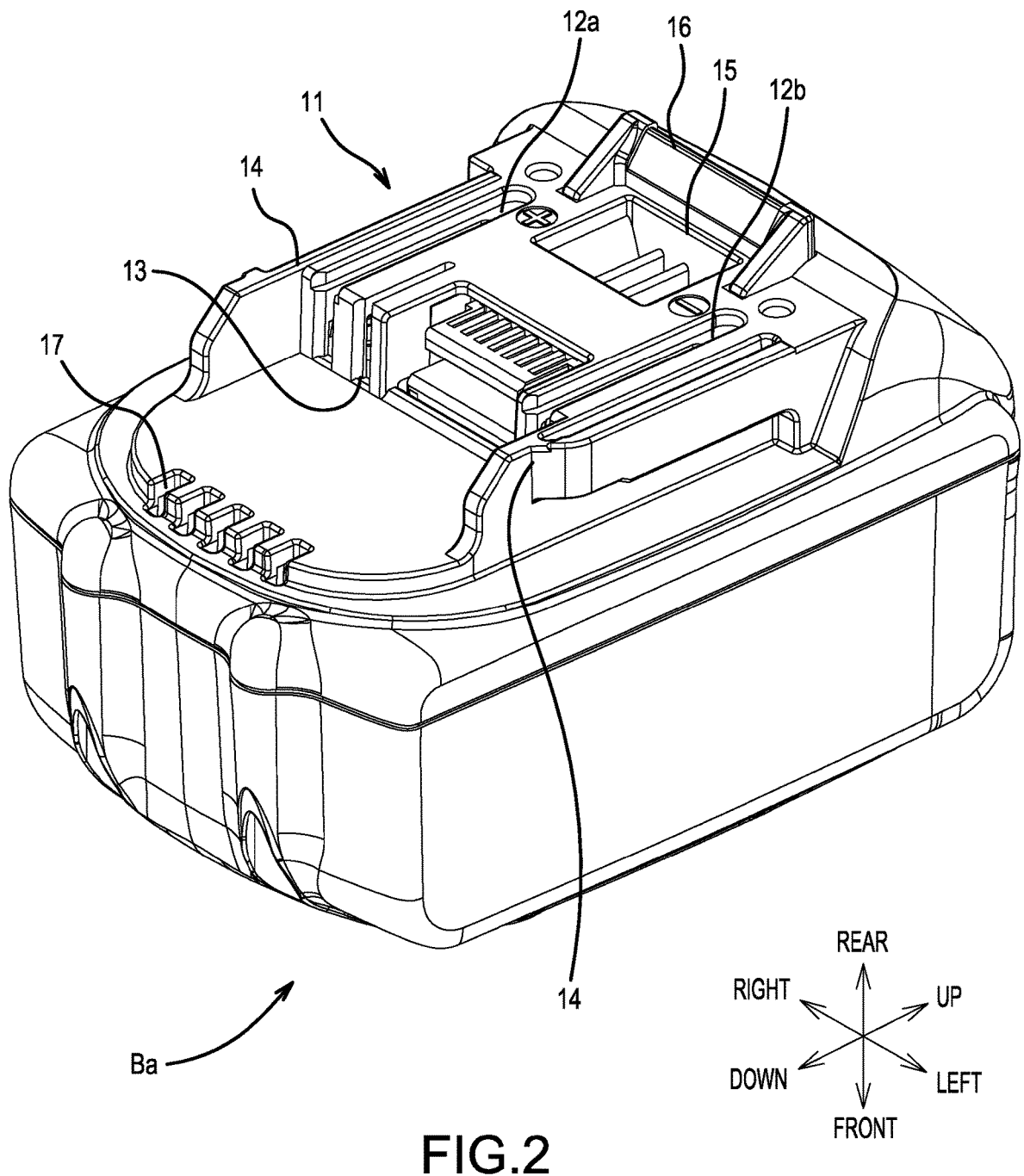
FIG. 2 is an oblique view that shows the external appearance of a first battery having a first type of mounting part.

The mounting part 11 of the first battery (battery pack, battery cartridge) Ba shown in FIG. 2 is mountable on the first connecting part 31. As shown in the charger circuit diagram of FIG. 13, the first connecting part 31 comprises a first positive-electrode-side terminal 91, a first temperature-input terminal 130, a communication terminal 140, a sense terminal 150, and a first negative-electrode-side terminal 160. In addition, the first connecting part 31 comprises two rail parts (rails) 311, which project frontward from the front surface 330 and extend in the up-down direction. The two rail parts 311 are provided side-by-side in the left-right direction and are spaced apart by a prescribed spacing to guide the slide mounting of the first battery Ba on the connecting part 31. Furthermore, the first connecting part 31 comprises a mating groove 313, which is formed in a recessed shape in an upper-end portion of the first connecting part 31, and a ventilation opening 312, which is formed downward of the mating groove 313. The mating groove 313 is provided such that it extends in a direction perpendicular to the extension direction of the rail parts 311. The ventilation opening 312 is provided on a front side of a fan 37 (described below) that is located inside the case 50.

The first battery Ba comprises, inside a hard resin case (housing) that is joined (screw-fastened) to the mounting part 11, a plurality of series-connected battery cells, a control circuit (e.g., a controller, processor, memory, etc.), and a voltage-detection circuit. The first battery Ba may be a battery pack (battery cartridge) that is used to power an electric power tool, a gardening tool, factory manufacturing equipment, or the like and contains, for example, lithium-ion battery cells. The rated voltage of the first battery Ba may be, e.g., 14.4 V or 18 V.

The mounting part 11 is provided on the rear surface of the case (housing) of the first battery Ba. As was noted above, the mounting part 11 is mountable on the first connecting part 31 of the charger 5, in order to be recharged, or on a power tool, in order to supply electric power from the first battery Ba, e.g., to a motor of the power tool. As shown in FIG. 2, the mounting part 11 comprises: a charging positive-electrode terminal 13, which is connectable to the first positive-electrode-side terminal 91 of the first connecting part 31; a discharging positive-electrode terminal 12a; a negative-electrode terminal 12b, which is connectable to the first negative-electrode-side terminal 160 of the first connecting part 31; and connection terminals, which are connectable to other terminals of the first connecting part 31. Furthermore, the first battery Ba is configured or adapted to receive the charging current from the charger 5 via the charging positive-electrode terminal 13 and to output a discharge current (e.g., to a motor of the power tool) via the discharging positive-electrode terminal 12a. In addition, the control circuit of the first battery Ba obtains information concerning the first battery Ba and outputs, to the charger 5 via the communication terminal 140 of the charger 5, digital data that represents information, e.g., concerning the battery cells (e.g., voltages thereof) of the first battery Ba. Furthermore, the control circuit of the first battery Ba outputs, to the charger 5 via the first temperature-input terminal 130, analog data that represents information concerning the state (e.g., temperature) of the first battery Ba.

In addition, the mounting part 11 comprises two slide rails 14, a latching hook 16, an air-intake port 15, and an air-exhaust port 17. The two slide rails 14 project rearward from the rear surface of the case and extend in the up-down direction. Furthermore, the two slide rails 14 are configured or adapted to engage with the rail parts 311 of the first connecting part 31. The latching hook 16 is provided in an upper-end portion such that it extends in a direction perpendicular to the extension direction of the slide rails 14 and engages with the mating groove 313 of the first connecting part 31. The air-intake port 15 is provided on a lower side of the latching hook 16, and the air-exhaust port 17 is provided at a lower-end portion. The slide rails 14, the latching hook 16, and the air-intake port 15 are disposed with positional relationships corresponding to those of the rail parts 311, the mating groove 313, and the ventilation opening 312 of the first connecting part 31, respectively.

When the first battery Ba is to be mounted on the first connecting part 31, the outer surfaces of the two slide rails 14 are engaged with the inner surfaces of the two rail parts 311, and the first battery Ba is slid from the upper side to the lower side. When the first battery Ba has been slid completely onto the first connecting part 31 and the latching hook 16 mates with the mating groove 313, further sliding (e.g., removal) of the first battery Ba is blocked and the mounting of the first battery Ba is thereby complete. The various terminals of the first connecting part 31 and the various terminals of the first battery Ba are also thereby connected. Furthermore, air blown from the fan 37 passes through the air-intake port 15 via the ventilation opening 312, enters and cools the interior of the first battery Ba, and is then discharged to the outside via the air-exhaust port 17. When the first battery Ba is to be removed from the first connecting part 31, the latching hook 16 is pushed to release it from the mating groove 313 so that the first battery Ba may be removed by sliding it from the lower side to the upper side.

Figure 3:
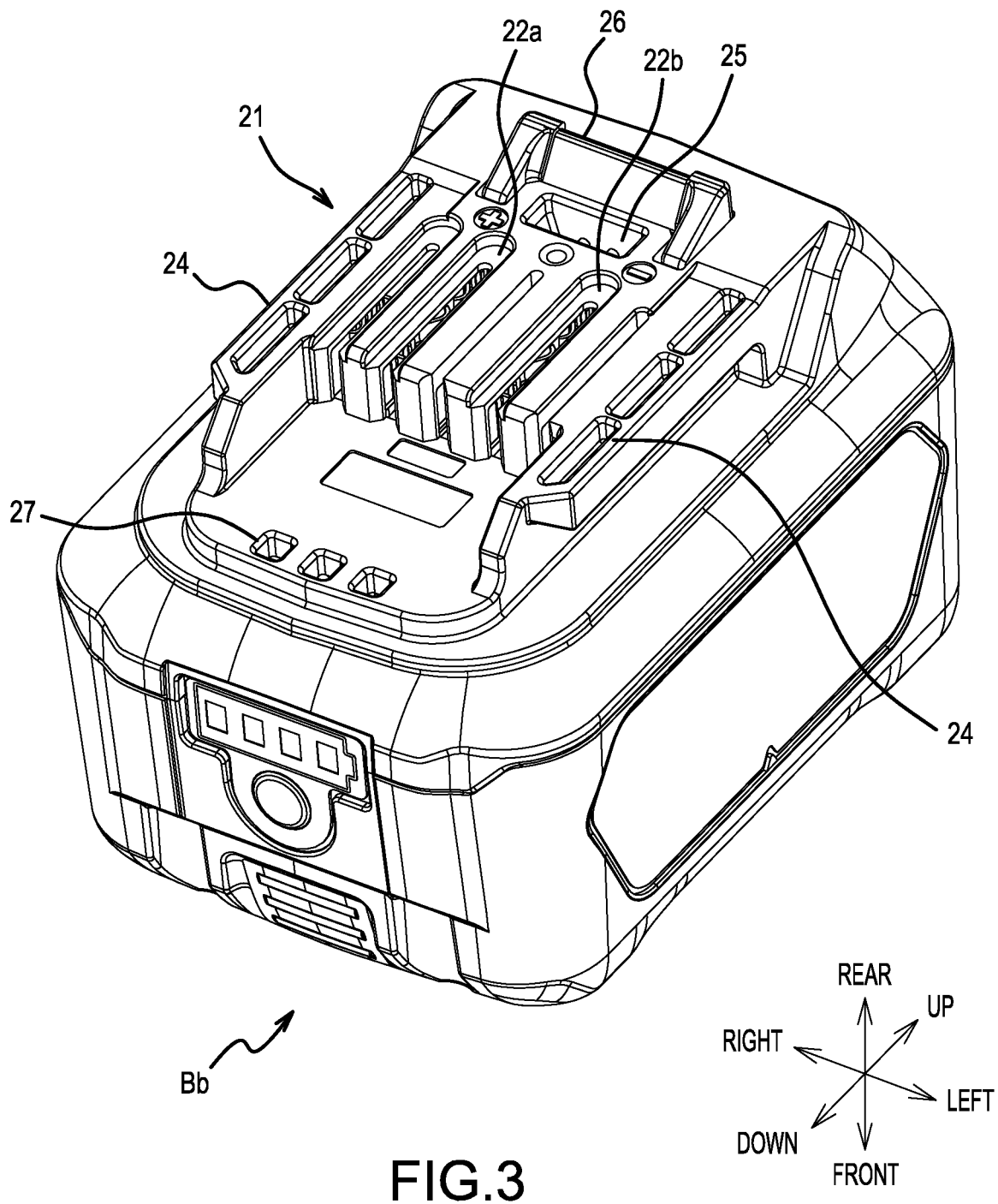
FIG. 3 is an oblique view that shows the external appearance of a second battery having a second type of mounting part that differs from (is incompatible with) the first type of mounting part.

The shape (overall configuration) of the second connecting part 32 differs from that of the first connecting part 31, and therefore the mounting part 21 of a second battery Bb, which is shown in FIG. 3, is (only) mountable on the second connecting part 32. That is, the connecting parts (charging ports) 31, 32 are configured such that the mounting part 11 of the first battery Ba cannot be mounted on (is incompatible with) the second connecting part 32, and the mounting part 21 of the second battery Bb cannot be mounted on (is incompatible with) the first connecting part 31. Therefore, it is not possible to charge the first battery Ba using (via) the second connecting part 32, and it is not possible to charge the second battery Bb using (via) the first connecting part 31. This is a safety feature that prevents the batteries Ba, Bb from being charged using the wrong charging protocol, wrong charging current, etc.

Figure 13:
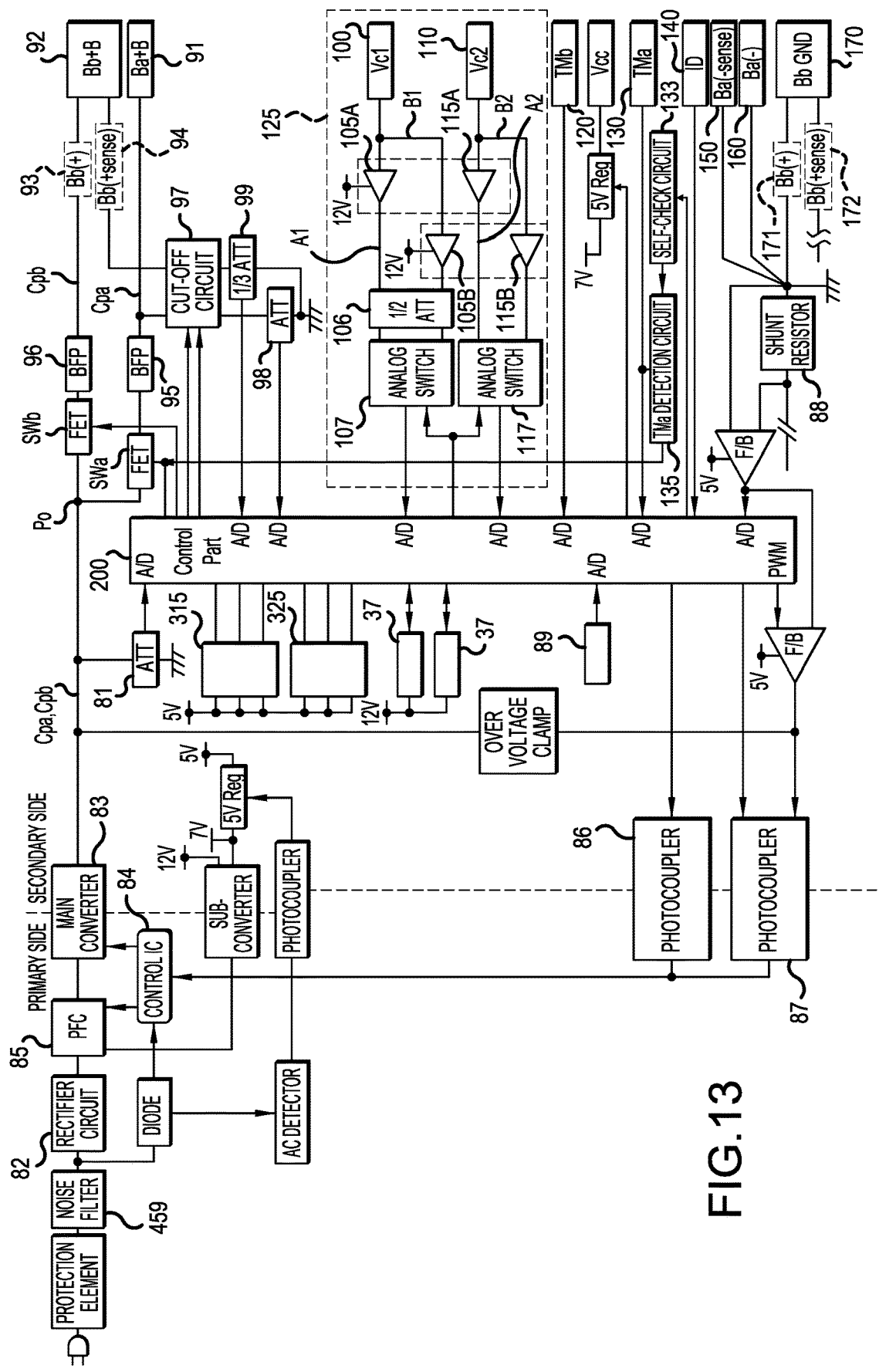
FIG. 13 is a block diagram that shows the electrical configuration (a circuit diagram) of the charger.

As shown in FIG. 13, the second connecting part 32 comprises a second positive-electrode-side terminal 92, voltage-detection terminals 100, 110, a second temperature-input terminal 120, and a second negative-electrode-side terminal 170. In addition, like the first connecting part 31, the second connecting part 32 comprises: two rail parts 321, which project forward from the front surface 330 and guide the slide mounting of the second battery Bb; a mating groove 323, which is formed in a recessed shape; and a ventilation opening 322. Although the rail parts 321, the mating groove 323, and the ventilation opening 322 respectively differ in size and shape from those of the rail parts 311, the mating groove 313, and the ventilation opening 312, they are disposed with the same positional relationships. In addition, another fan 37 is installed directly behind the ventilation opening 322.

The second battery Bb comprises, inside a hard resin case (housing) that is joined (screw-fastened) to the mounting part 21, three series-connected battery cells. The second battery Bb also may be a battery pack (battery pack) that is used to power an electric power tool, a gardening tool, factory manufacturing equipment, or the like and contains, for example, lithium-ion battery cells. In addition, the rated voltage of the second battery Bb is preferably different from the rated voltage of the first battery Ba, and may be, e.g., 10.8 V. In the present embodiment, unlike the first battery Ba, the second battery Bb does not comprise a control circuit. Consequently, the charger 5 is configured or adapted to detect the state (e.g., voltage (remaining battery capacity), temperature, etc.) of the second battery Bb using the voltage-detection terminals 100, 110, the second temperature-input terminal 120, etc.

The mounting part 21 is disposed on the rear surface of the case of the second battery Bb. The mounting part 21 is mountable on the second connecting part 32 of the charger 5, in order to recharge it, or e.g., on a power tool to supply electric power from the second battery Bb to the power tool. The mounting part 21 comprises a positive-electrode terminal 22a, which is connectable to the second positive-electrode-side terminal 92 of the second connecting part 32, a negative-electrode terminal 22b, which is connectable to the second negative-electrode-side terminal 170, and connection terminals, which are connectable to other terminals of the second connecting part 32.

In addition, similar to the mounting part 11, the mounting part 21 includes slide rails 24, a latching hook 26, and an air-intake port 25 that are respectively provided at locations corresponding to the rail parts 321, the mating groove 323, and the ventilation opening 322 of the second connecting part 32. Furthermore, an air-exhaust port 27 is provided at a lower-end portion.

Methods for mounting the second battery Bb onto and for removing the second battery Bb from the second connecting part 32 are the same as in the first battery Ba. When the second battery Bb is mounted on the second connecting part 32, the various terminals of the second connecting part 32 and the various terminals of the second battery Bb are connected.

Referring to FIG. 1, the first display part 315 comprises three LEDs having three colors—green, red, and yellow—that indicate the state of the first battery Ba. The states indicated by the first display part 315 are, for example, CHARGING STANDBY, CHARGING COMPLETE. Likewise, the second display part 325 indicates the state of the second battery Bb using three LEDs having three colors.

Figure 4:
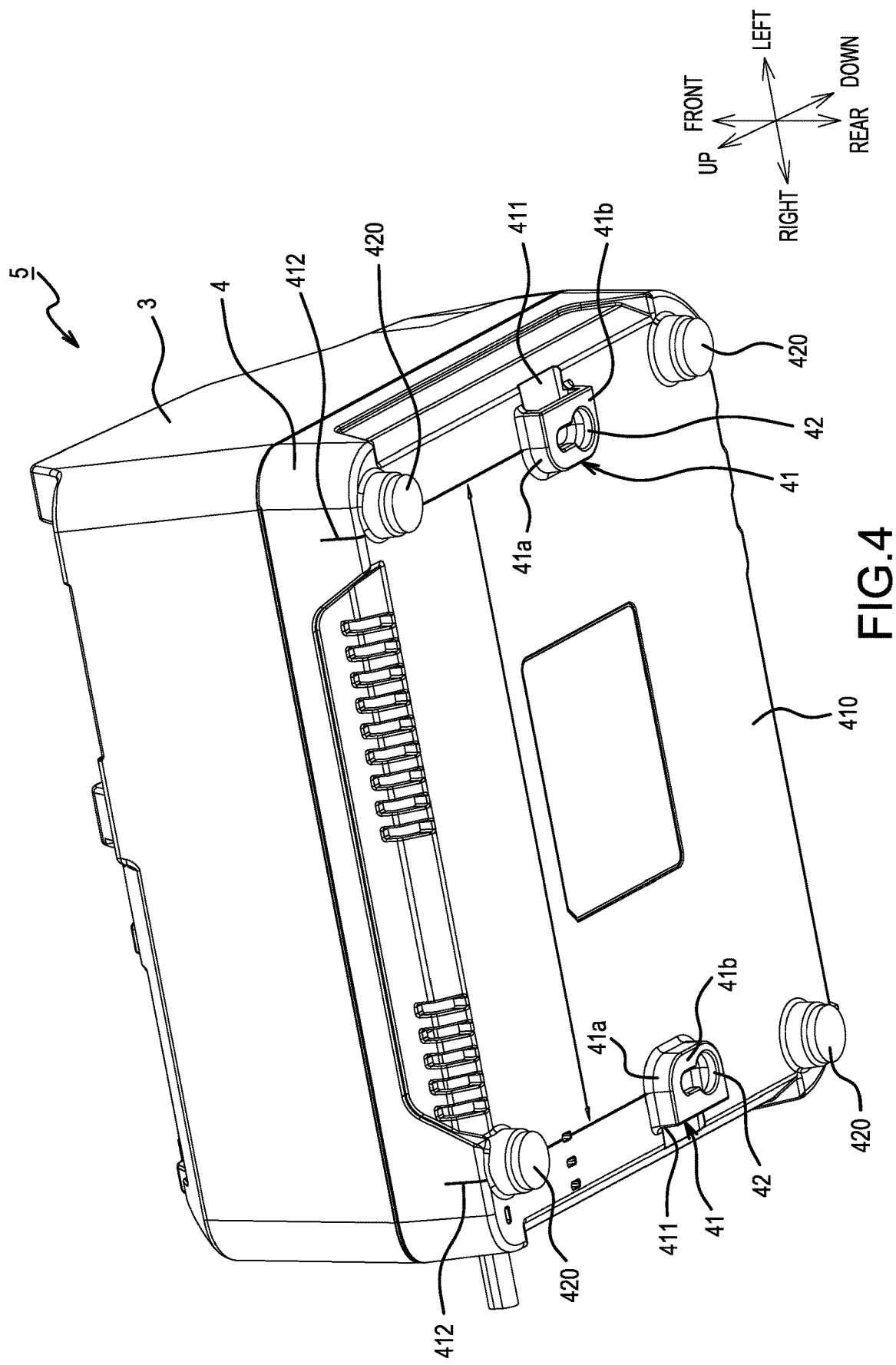
FIG. 4 is an oblique view that shows a rear surface of the external appearance of the charger.
Figure 5:
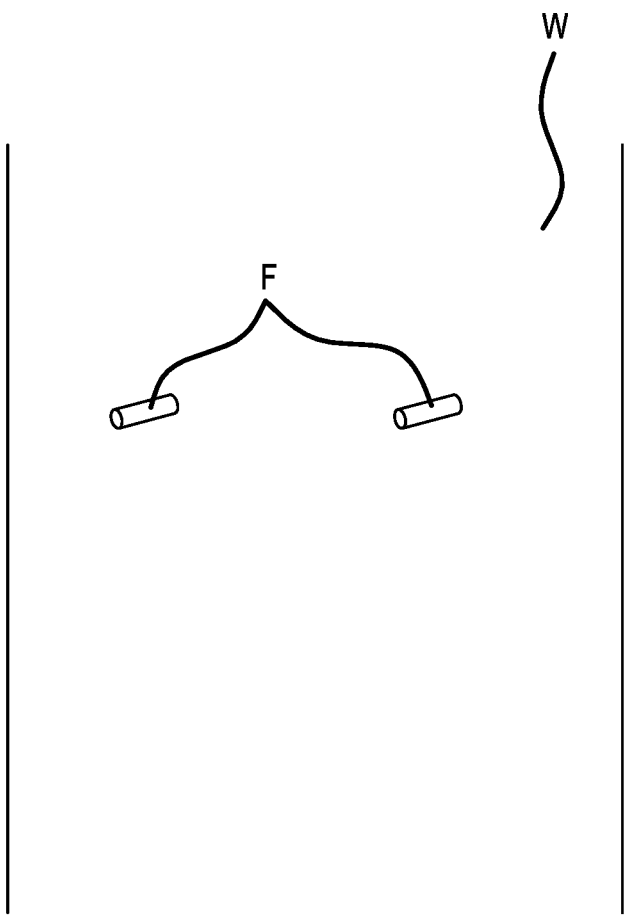
FIG. 5 shows a wall (mounting surface), on which the charger is mounted.

FIG. 5 shows a wall W, which is a representative, non-limiting mounting surface on which the charger 5 can be mounted. The charger 5 is configured to be used by mounting it on the wall W, with the rear surface of the case 50 facing toward the wall W. As shown in FIG. 4, the case 50 has a rear surface that is formed into a rectangular shape; furthermore, at each of the four corners of the rear surface, a leg part 420 is provided that is formed such that it projects rearward from the rear surface.

In addition, the case 50 comprises mounting parts 41, which are formed such that they project rearward from the rear surface 410 at substantially the center of the rear surface 410 in the up-down direction on a left-end part and a right-end part. The lengths of the leg parts 420 and the mounting parts 41 in the front-rear direction are approximately the same. Each mounting part 41 has: a side surface 41a, which extends vertically rearward from the rear surface 410 of the case 50 and whose cross section parallel to the rear surface 410 has a substantially semielliptical shape; and a plate-shaped member 41b, which is connected to a rear-end part of the side surface 41a and has a substantially semielliptical shape parallel to the rear surface 410. Furthermore, one mating hole 42 is formed in each of the plate-shaped members 41b. The mating holes 42 mate with (receive) projections F provided on the wall W. The length of the projections F is shorter than the length of the mounting parts 41 in the front-rear direction.

Furthermore, grooves 411, which are recessed forward, are formed in portions of the rear surface 410 opposing the plate-shaped members 41b. In addition, lines 412, which extend in the up-down direction, are drawn on the rear surface 410 from the left and right mounting parts 41 toward upper-end parts of the rear surface 410. These lines 412 are drawn such that they extend in the front-rear direction from the upper-end parts of the rear surface 410 to the upper surface of the case 50. When the charger 5 is to be mounted on the wall W, the projections F and the charger 5 are aligned in the left-right direction using the lines 412, which extend to the upper surface of the charger 5, and the projections F and the charger 5 are aligned in the up-down direction using the grooves 411. Furthermore, the charger 5 is mounted on the wall W by mating the mating holes 42 of the two mounting parts 41 with the projections F.

It is noted that the number of the mounting parts 41, the locations at which they are installed on the rear surface 410, and the like, are not limited to those described above. For example, just one of the mounting parts 41 may be provided on the rear surface 410, or three or more of the mounting parts 41 may be provided on the rear surface 410. In addition, the locations at which the mounting parts 41 are installed may be anywhere as long as they are located such that the charger 5 can be mounted on the wall W with good balance. Furthermore, the mounting surface is not limited to the wall W and may be, for example, the side surface of a shelf.

1-2. Interior Configuration 1-2-1. Interior of Rear Case

Next, the mechanical configuration of the interior of the charger 5 will be explained, with reference to FIG. 6 to FIG. 12. As shown in FIG. 1, the case 50 of the charger 5 is formed by joining a front case 3 and a rear case 4.

First, the configuration of the interior of the rear case 4 will be explained, with reference to FIG. 6, which shows a view, from the rear, of the rear case 4, with the front case 3 removed from the case 50. In the rear case 4, an opening surface is formed in a rectangular-tray shape; furthermore, projection parts (projections) 43, each having a projecting shape that projects toward the front side, are formed at the four corners of the rear case 4. By mating the projection parts 43 with recessed parts 35, which are formed at (in) the four corners of the front case 3 (described below), the front case 3 and the rear case 4 are fixed in the joined state, thereby constituting the case 50.

In addition, a circuit board 45 is housed inside the rear case 4 without being fixed to the rear case 4 by a screw or the like. The size of the rear surface 410 of the rear case 4 is substantially equal to that of the circuit board 45. Furthermore, numerous electronic parts are mounted on the circuit board 45, thereby constituting a charging circuit that charges the first battery Ba and the second battery Bb. On a right-end part of the circuit board 45, a power supply cord Pw is connected, and a smoothing capacitor 457 of a main converter 83 and noise filters 459 are mounted. In addition, on a left-end part of the circuit board 45, a sub-circuit board 451 is mounted perpendicularly to the circuit board 45. A microcomputer that includes a CPU, ROM, and RAM is included on the sub-circuit board 451; a control part (controller) 200 that performs charging control is thereby equipped (provided) on the sub-circuit board 451. In addition, a transformer 456 of the main converter 83 is installed slightly upward of the center of the circuit board 45. Furthermore, heat sinks 454, 455 for preventing overheating are respectively installed between the transformer 456 on one side and the sub-circuit board 451 installed on the control part 200 on the other side and between the transformer 456 on one side and the smoothing capacitor 457 and the noise filters 459 on the other side.

Figure 6:
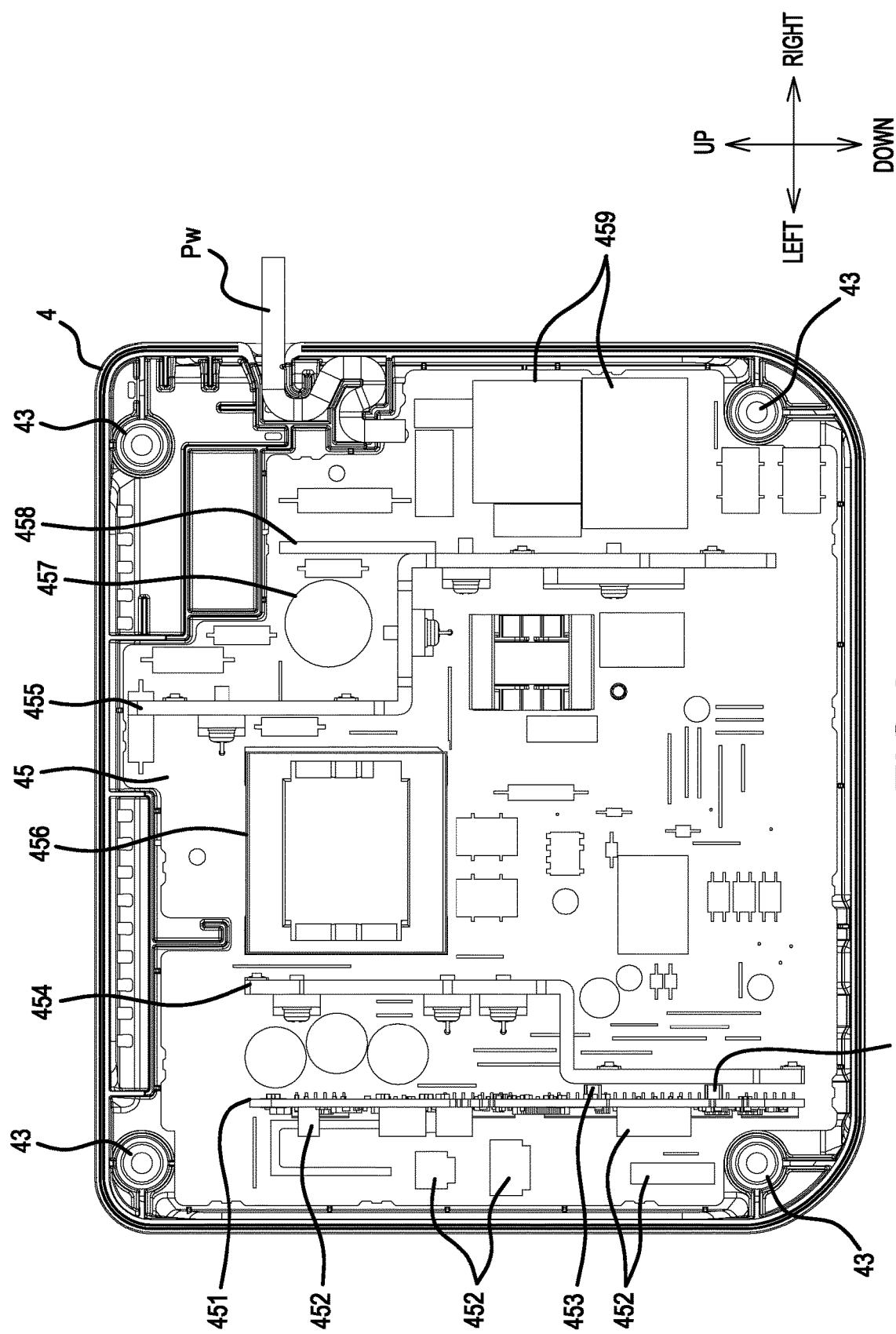
FIG. 6 is a front view that shows a circuit board, which is housed in a lower case (rear case) of the charger.

As shown in FIG. 6, the transformer 456 and the noise filters 459 occupy a large surface area of the circuit board 45. Even though the charger 5 comprises two connecting parts (charging ports), namely, the first connecting part 31 and the second connecting part 32, just one set of the one main converter 83 and the two noise filters 459 is provided, which is the same as a conventional charger having only one connecting part (charging port). If the first battery Ba and the second battery Bb are simultaneously mounted on the charger 5, then the charger 5 charges the battery packs sequentially one at a time using the single main converter 83. That is, the single main converter 83 and the single noise filter 459 of the charger 5 alternately service the two battery packs. Consequently, even though the charger 5 comprises two connecting parts, the overall size of the charger 5 is not increased as compared to a conventional charger having only one connecting part (charging port).

Furthermore, in the charger 5, some of the electronic parts are mounted on the sub-circuit board 451, which is installed perpendicularly to the circuit board 45. This design enables the overall size of the charger 5, particularly the planar size perpendicular to the front-rear direction, to remain relatively compact, and therefore the size of the charger 5 does not differ much from that of a conventional charger having just one connecting part.

Referring again to FIG. 6, an anti-noise shield board 458 that shields noise is installed, on the circuit board 45, perpendicularly to the circuit board 45 and between the smoothing capacitor 457 side and the power supply cord Pw side. Noise generated on the left side of the shield board 458 can be shielded thereby. Furthermore, insulating spacers 453 are mounted between the sub-circuit board 451 and the heat sink 454. Thereby, the sub-circuit board 451 can be supported by the heat sink 454 spaced apart therefrom by an insulated spacing created by the insulating spacers 453.

In addition, a plurality of connectors 452 for connecting a connection cord H3, fan wire harnesses, and the like (described below) are provided: (i) on the sub-circuit board 451 on the side opposing the left-side surface of the rear case 4, and (ii) on the circuit board 45 between the left-side surface of the rear case 4 and the sub-circuit board 451. The left-side surface of the rear case 4 is parallel and closest to the sub-circuit board 451. In addition, the connection cord H3 connects the circuit board 45 with the first connecting part 31 and the second connecting part 32. Thus, by providing all the connectors 452 between the surface on one side of the sub-circuit board 451 and the side surface of the rear case 4 opposing that surface on the one side, the connection cord H3 does not extend beyond the end parts of the sub-circuit board 451. In this way, the connection cord H3 can be prevented from being damaged by contact with the sharp edges of the sub-circuit board 451.

1-2-2. Interior of Front Case

Figure 7:
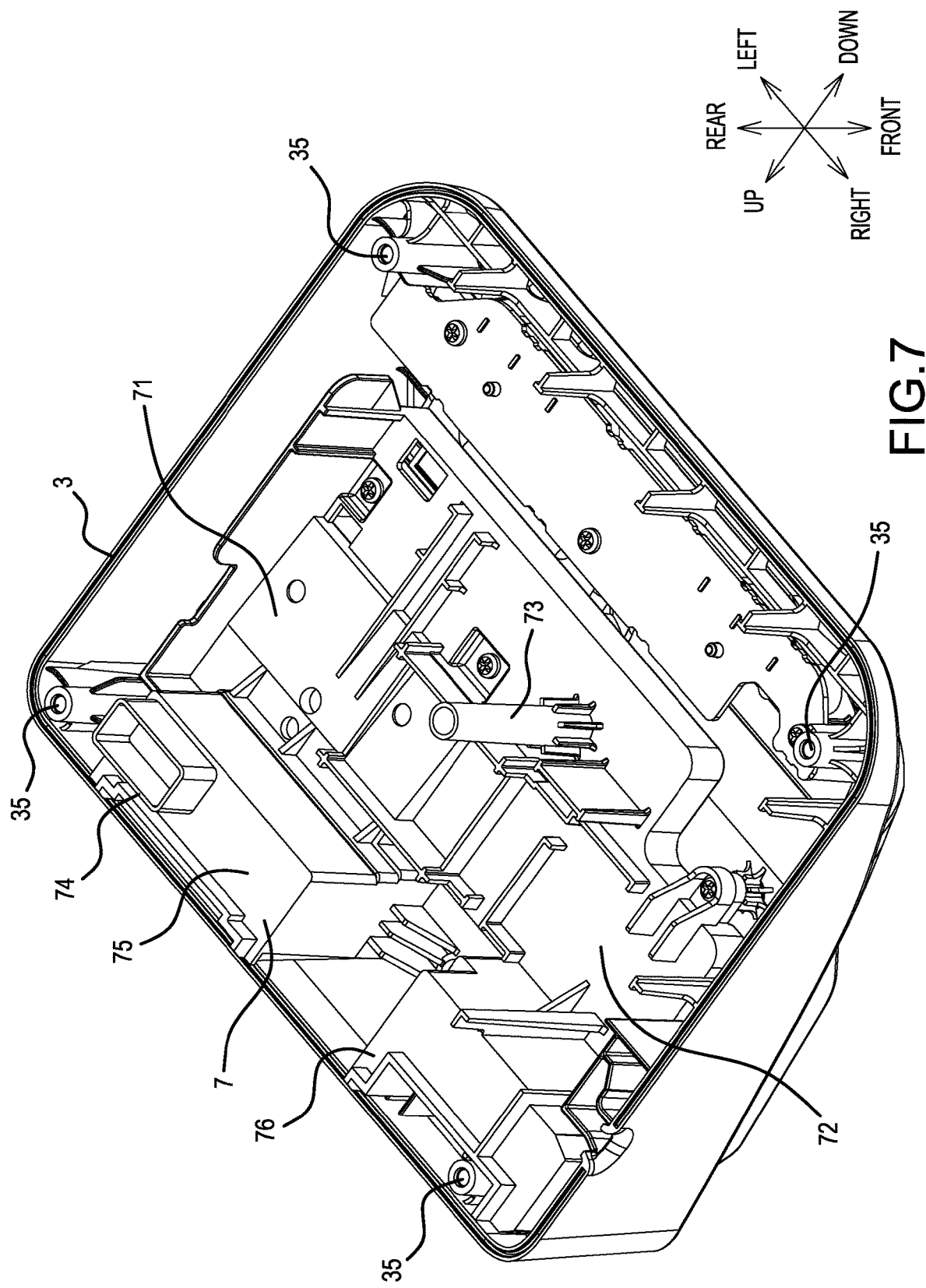
FIG. 7 is an oblique view that shows a rear surface of an upper case (front case) of the charger, in which a base member is mounted.
Figure 8:
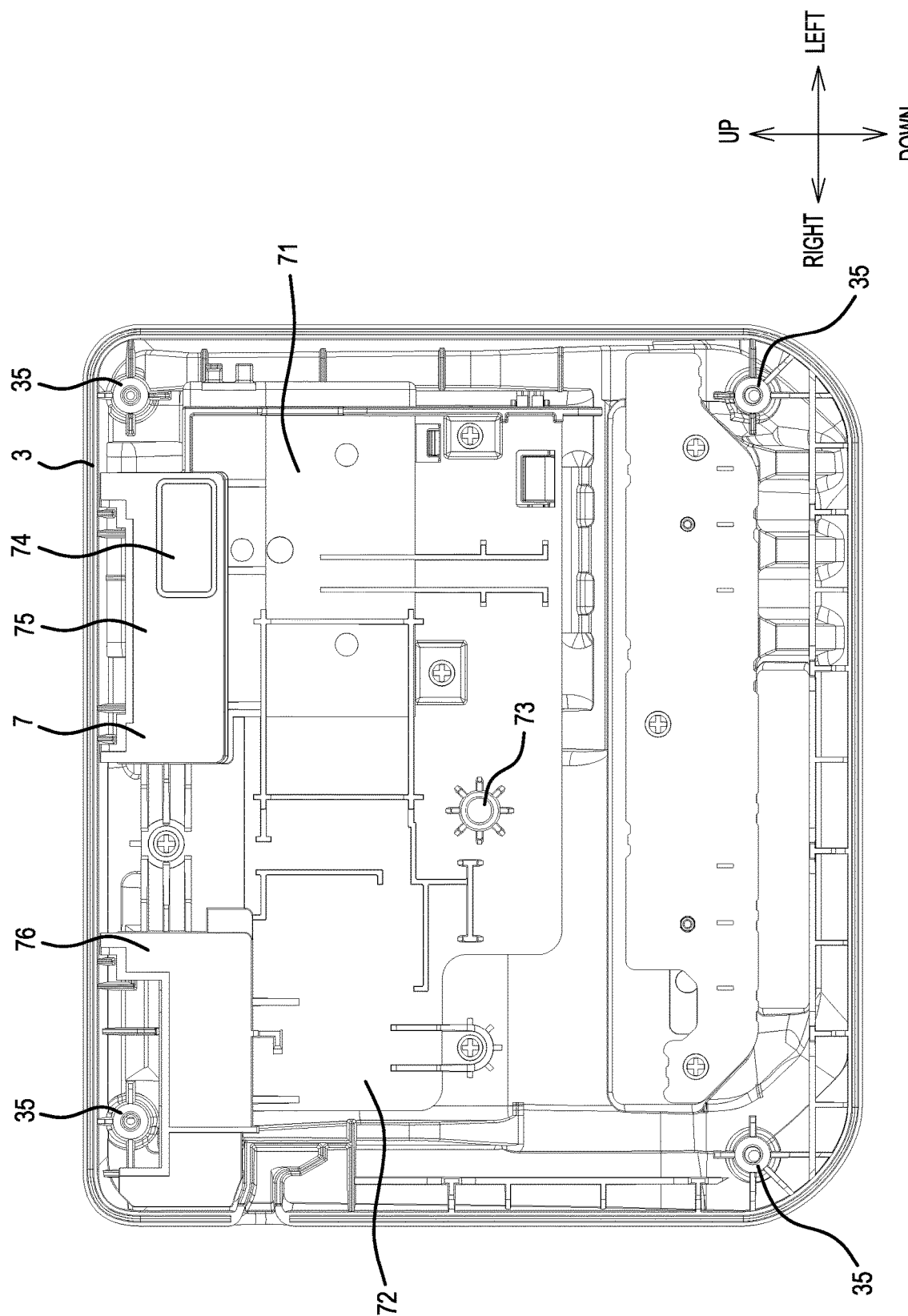
FIG. 8 is a front view that shows the rear surface of the upper case, in which the base member is mounted.
Figure 9:
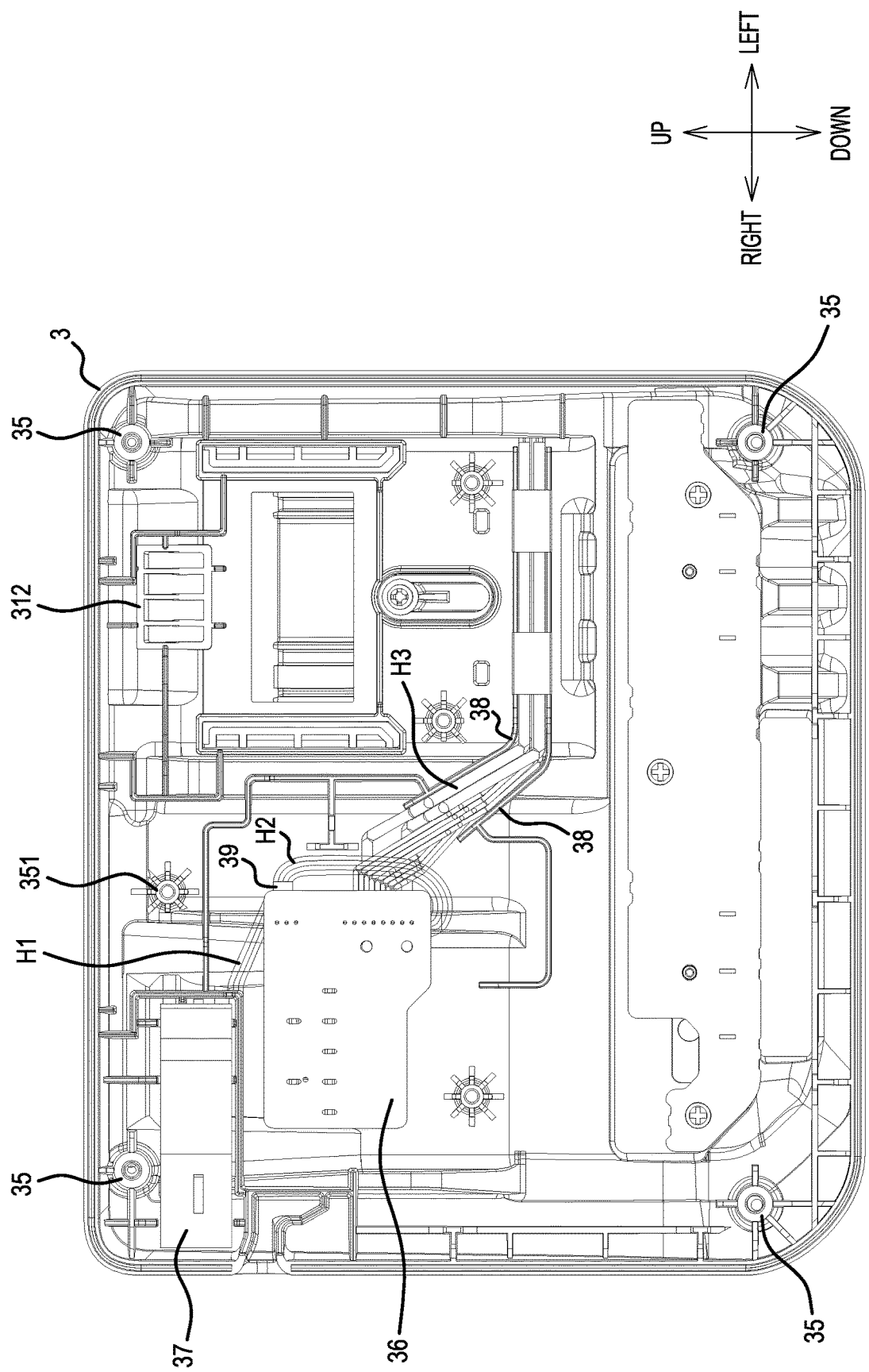
FIG. 9 is a front view that shows the rear surface of the upper case, wherein the base member has been removed.
Figure 10:
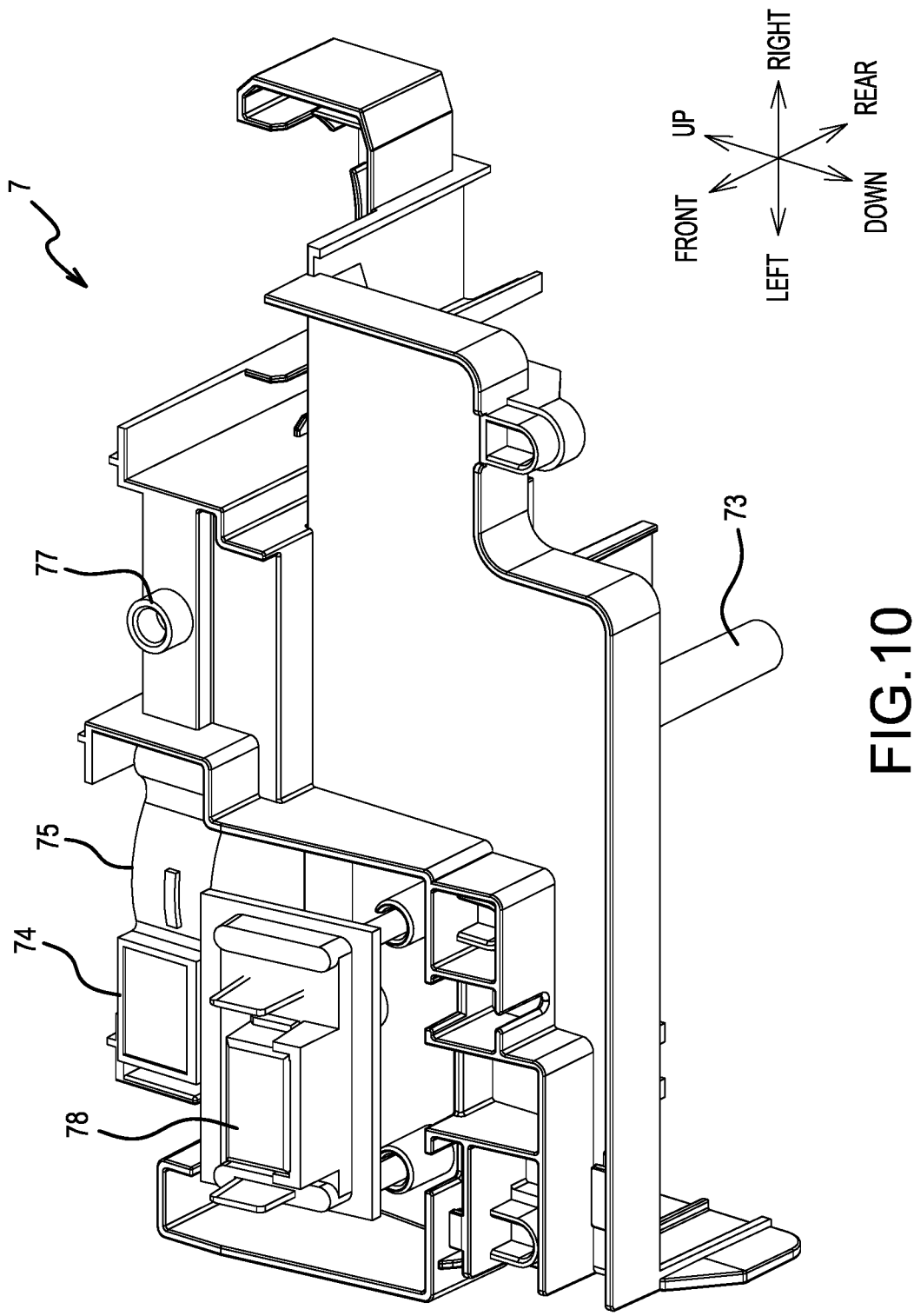
FIG. 10 is an oblique view that shows the front surface of the base member.
Figure 11:
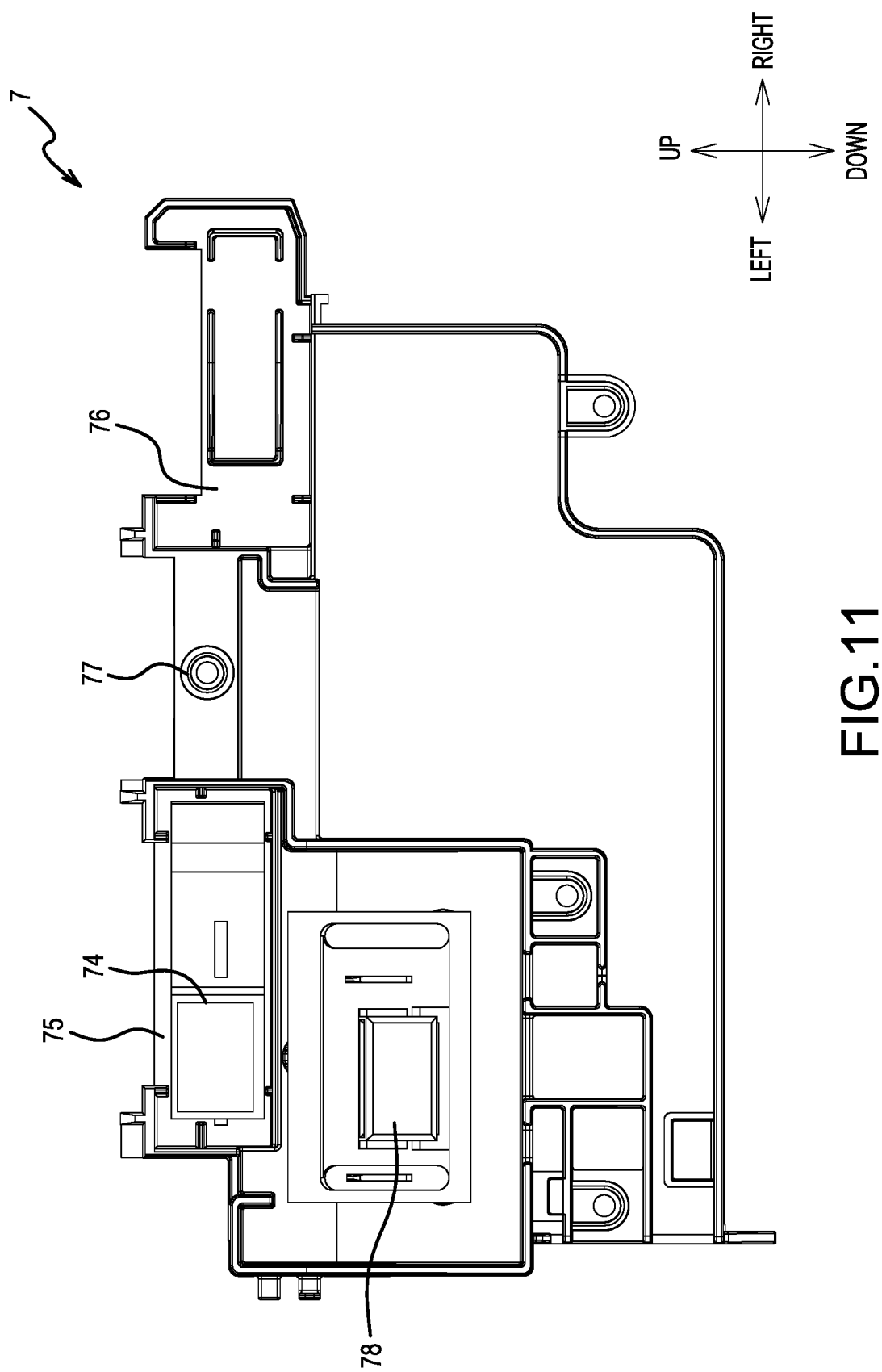
FIG. 11 is a front view that shows the front surface of the base member.
Figure 12:
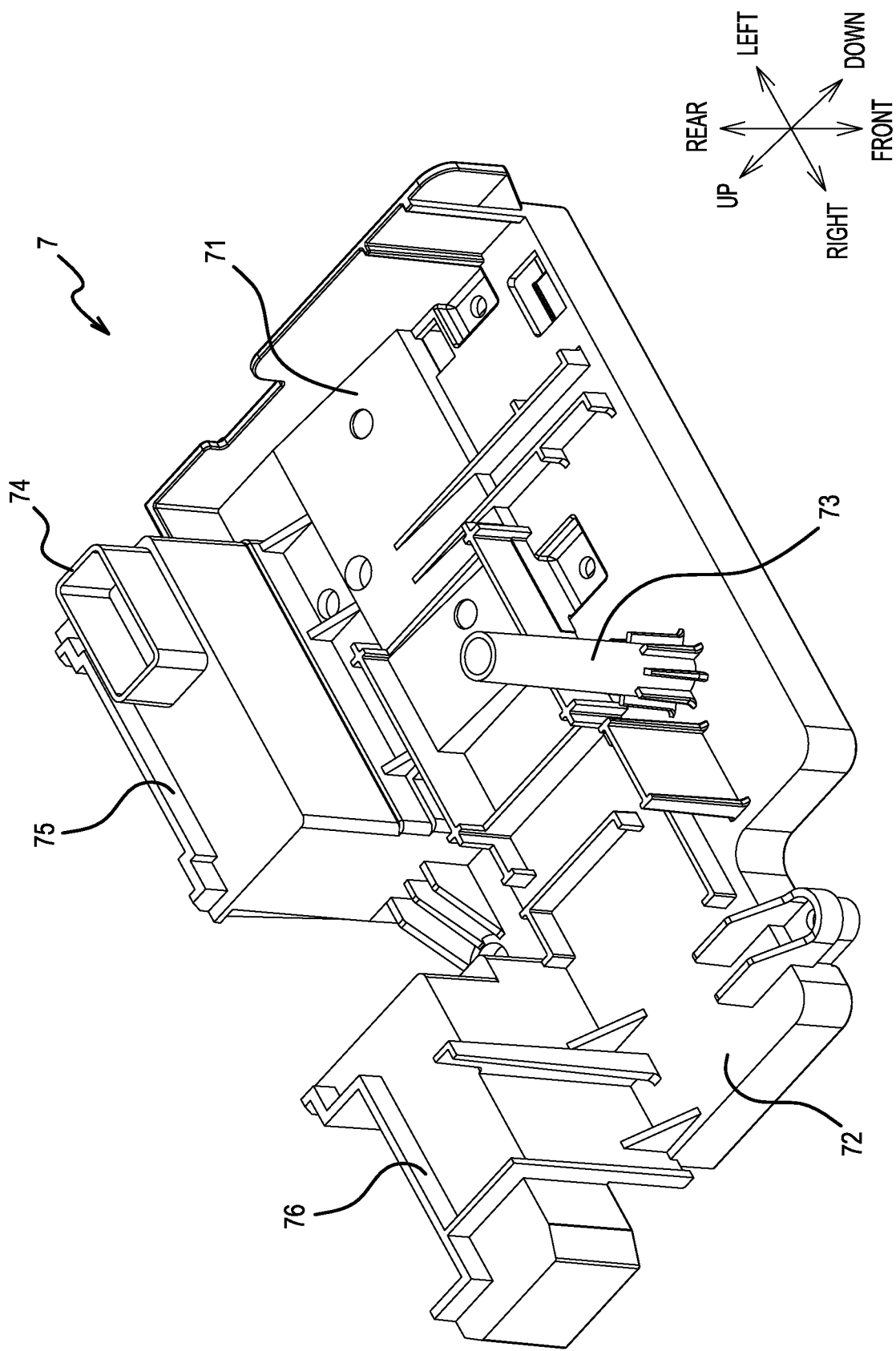
FIG. 12 is an oblique view that shows the rear surface of the base member.

Next, the configuration of the interior of the front case 3 will be explained, with reference to FIGS. 7-12. FIGS. 7 and 8 are views, from the rear, of the front case 3, with the rear case 4 removed from the case 50. A base member 7, which is shown in FIGS. 10-12, is mounted on (in) the front case 3. FIG. 9 is a view, from the rear, of the front case 3, with the base member 7 removed from the front case 3.

First, the configuration (state) in which the base member 7 has been removed from the front case 3 will be explained. As shown in FIG. 9, with regard to the front case 3, the opening surface is formed into a rectangular-tray shape; the circular-column-shaped recessed parts 35, which project rearward and have hollow interiors, are formed at the four corners of the front case 3. The projection parts 43 of the rear case 4 described above mate with the recessed parts 35.

In addition, the fan 37 for cooling the second battery Bb is installed on the right side of the upper part of the front case 3. Likewise, the fan 37 for cooling the first battery Ba is installed on the left side of the upper part of the front case 3; however, FIG. 9 shows the configuration (state) in which the left-side fan 37 has been removed. Furthermore, the ventilation openings 312, 322 for discharging air blown from the fans 37 are formed on the front sides of the left and right fans 37, respectively. A projection part 351, which projects rearward, is formed between the ventilation opening 312 and the ventilation opening 322. The projection part 351 mates with a recessed part 77 of the base member 7, which is described below.

In addition, on the right side of the upper part of the front case 3, a terminal circuit board 36 is installed downward of the right-side fan 37. The various connection terminals, connectors, and the like of the second connecting part 32 are mounted on the terminal circuit board 36. On the other hand, the various connection terminals, connectors, and the like of the first connecting part 31 are included in a terminal part 78 of the base member 7, which is shown in FIGS. 10 and 11. In the terminal part 78, the various connection terminals, connectors, and the like of the first connecting part 31 are formed (embedded) in a resin base using insert molding. The terminal part 78 is installed downward of the left-side fan 37 when the recessed part 77 of the base member 7 is mated with the projection part 351.

Furthermore, in the front case 3, a pair of ribs 38 is formed at a prescribed spacing, namely one on the lower side of the location at which the terminal part 78 is installed and one between the installation location of the terminal part 78 and the terminal circuit board 36. Each rib 38 has a portion that extends along the left-right direction downward of the installation location of the terminal part 78 and a portion that extends toward the terminal circuit board 36 from the portion along the left-right direction. The connection cord H3, which is connected to the various connection terminals of the terminal circuit board 36, passes between the pair of ribs 38 and is fixed with tape. Furthermore, after passing between the pair of ribs 38, the connection cord H3 is wired to the left-side surface of the front case 3 and then connected to the connectors 452, which are provided on the left-end part of the rear case 4. Thereby, the connection cord H3 can be easily wired to the connectors 452 and held there.

In addition, the connection cord H3 connected to the terminal part 78 and the fan wire harness connected to the left-side fan 37 are wired along the left-side surface of the front case 3 and connected to the connectors 452 of the rear case 4. Here, the distance from the right-side fan 37 to its corresponding connector 452 is longer than the distance from the left-side fan 37 to its corresponding connector 452. Therefore, if an attempt were to be made to connect the right-side fan 37 to the connector 452 using only one continuous fan wire harness, that wire harness must be longer than the left-side fan wire harness, and therefore the number of types of components increases.

In order to avoid this problem, the terminal circuit board 36 comprises a relay connector 39 that serves as a relay for the right-side fan wire harness. A first fan wire harness H1, which is connected to the right-side fan 37, is connected to one end of the relay connector 39. A second fan wire harness H2 is connected to the other end of the relay connector 39, and the second fan wire harness H2 is wired by being passed between the pair of ribs 38 and then is connected to the connectors 452. The first and second fan wire harnesses H1, H2 have the same length as the fan wire harness connected to the left-side fan 37. Thus, by relaying the first fan wire harness H1, which is connected from the connector 452 to the far-side fan 37, using the terminal circuit board 36, it is possible to prevent an increase in the number of component types.

Next, the base member 7 will be explained. The base member 7 is formed of a hard resin and is disposed between the fans 37 and the terminal circuit board 36 on one side and the circuit board 45 on the other side. As shown in FIGS. 10-12, a first fan-cover part 75, which covers the left-side fan 37, is formed on the left side of the upper part of the base member 7. A second fan-cover part 76, which covers the right-side fan 37, is formed on the right side of the upper part of the base member 7. In addition, the terminal part 78, which projects forward, is formed on the lower side of the first fan-cover part 75. Furthermore, the circular-column-shaped recessed part 77, which projects forward and has a hollow interior, is formed between the first fan-cover part 75 and the second fan-cover part 76. When the base member 7 is inserted into the front case 3 from the rear, the projection part 351 of the front case 3 and the recessed part 77 mate, and thereby the base member 7 is fixed to the front case 3.

In addition, first and second insulating parts 71, 72 are formed in (on) the base member 7 downward of the first and second fan-cover parts 75, 76, respectively. The first insulating part 71 is formed at a location directly behind the terminal part 78. The second insulating part 72 is formed at a location directly behind the terminal circuit board 36 when the base member 7 is fixed to the front case 3. In a conventional charger having only one connecting part, the base member typically covers only the terminal circuit board or the terminal part of the single connecting part, and therefore the base member is formed such that its length in the left-right direction is approximately half that of the base member 7 of the present embodiment. That is, the base member 7 of the present embodiment is formed such that its length in the left-right direction is greater than that of a base member for a charger having just one connecting part, and such that it covers both the terminal part 78 and the terminal circuit board 36. Thereby, it is possible to ensure that the circuit board 45 is insulated from the terminal part 78 and the terminal circuit board 36.

Furthermore, on the base member 7, a circular-column-shaped rib 73, which projects rearward and is hollow, is formed on the lower side of an intermediate portion between the first insulating part 71 and the second insulating part 72. In addition, on the base member 7, a square-column-shaped rib 74, which projects rearward from the fan-cover part 75 and is hollow, is formed on the first fan-cover part 75. The lengths of the ribs 73, 74 is preferably set such that the ribs 73, 74 press the circuit board 45 rearward when the front case 3 and the rear case 4 have been joined. By virtue of the ribs 73, 74 pressing the circuit board 45 rearward, it is possible to inhibit an impact (shock) from being transmitted to the circuit board 45 in the event that the charger 5 is dropped.

It is noted that the first battery Ba and the second battery Bb are one representative, non-limiting example of the "at least two slide-type batteries" according to this aspect of the present disclosure, and the first connecting part 31 and the second connecting part 32 are one representative, non-limiting example of the "plurality of connecting parts" according to this aspect of the present disclosure. The case 50 is one representative, non-limiting example of the "case" according to this aspect of the present disclosure. The mounting parts 41 are one representative, non-limiting example of the "at least one mounting part" according to this aspect of the present disclosure, and the mating hole 42 is one representative, non-limiting example of the "mating hole" according to this aspect of the present disclosure. The wall W is one representative, non-limiting example of the "mounting surface" according to this aspect of the present disclosure, and the projections F are one representative, non-limiting example of the "projection(s) provided on the mounting surface" according to this aspect of the present disclosure.

2. Electrical Configuration

Next, a representative, non-limiting electrical configuration (circuit diagram) of the charger 5 will be explained with reference to FIG. 13, which shows the configuration of the charging circuit of the charger 5. The charging circuit is configured such that the primary side and the secondary side are insulated (isolated) from one another. A rectifier circuit 82, a power factor correction circuit 85, and a control IC 84 are provided on the primary side of the charging circuit. The main converter 83 and photocouplers 86, 87 straddle the primary and secondary sides of the charging circuit.

The rectifier circuit 82 rectifies AC electrical power supplied from an external power supply such as a commercial power supply. The external power supply may be any supply of power, such as 100 VAC, 110 VAC or 200 VAC. The power factor correction circuit 85 corrects the power factor of the DC power that has been rectified by the rectifier circuit 82. The main converter 83 is a step-down converter, such as a flyback converter, that steps down the voltage of the DC power, whose power factor has been corrected by the power-factor improving circuit 85, to a voltage suited to charging the first battery Ba or the second battery Bb. The control IC 84 is an integrated circuit that controls the power factor correction circuit 85 and the ON/OFF states of the switching elements of the main converter 83.

The photocoupler 86 transmits, from the control part 200 to the control IC 84, control instructions for stopping and enabling charging. The photocoupler 87 provides feedback for constant-current control and overvoltage clamping. In addition, the photocoupler 87 is configured to receive control instructions from the control part 200 and is also capable of transmitting, from the control part 200 to the control IC 84, control instructions for stopping and enabling charging.

The control part 200, a temperature-detection circuit 89, the first positive-electrode-side terminal 91, the second positive-electrode-side terminal 92, the first temperature-input terminal 130, the second temperature-input terminal 120, the communication terminal 140, the sense terminal 150, the first negative-electrode-side terminal 160, the second negative-electrode-side terminal 170, and a monitor circuit (voltage monitor circuit) 125 are provided on the secondary side of the charging circuit.

The control part 200 performs charging control, checking (fault checking), and the like for the first battery Ba and the second battery Bb. In addition, the control part 200 performs lamp-ON control for the first and second display parts 315, 325, operation control of the left and right fans 37, and the like. Furthermore, when the connection of the first battery Ba has been detected, the control part 200 causes a regulator to generate a power supply Vcc, which is the operating power supply of the control circuit of the first battery Ba, and this power supply Vcc is supplied to the first battery Ba.

The temperature-detection circuit 89 comprises a thermistor and detects temperature. The thermistor of the temperature-detection circuit 89 is mounted or fixed near a component whose temperature is to be monitored. In the present embodiment, a component inside the main converter 83 is the target whose temperature is to be monitored. The temperature-detection circuit 89 inputs analog data to an A/D converter of the control part 200; this analog data represent the voltage that corresponds to the temperature Ti of the component inside the main converter 83. The control part 200 acquires, via the A/D converter, the digital data that represent the voltage corresponding to the temperature Ti, and monitors the temperature Ti. Furthermore, the control part 200 controls the main converter 83 such that the temperature Ti stays below a preset prescribed value. It is noted that the determination of whether the analog data of the voltage corresponding to the temperature Ti exceeds the prescribed value may be made using a comparator or the like, and digital data that represent that determination result may be input into a digital-input part of the control part 200. Furthermore, the control part 200 may control the main converter 83 based on the inputted determination result such that the temperature Ti stays below the stipulated value.

The charging positive-electrode terminal 13 of the first battery Ba is connected to the first positive-electrode-side terminal 91, and the negative-electrode terminal 12b of the first battery Ba is connected to the first negative-electrode-side terminal 160. On the other hand, the positive-electrode terminal 22a of the second battery Bb is connected to the second positive-electrode-side terminal 92, and the negative-electrode terminal 22b of the second battery Bb is connected to the second negative-electrode-side terminal 170. A positive-electrode terminal 93 and a positive-electrode-side sense terminal 94 are connected to the second positive-electrode-side terminal 92, and a negative-electrode terminal 171 and a negative-electrode-side sense terminal 172 are connected to the second negative-electrode-side terminal 170.

Output terminals of the first positive-electrode-side terminal 91 and the main converter 83 are connected by (via) a first charging path Cpa, and output terminals of the positive-electrode terminal 93 and the main converter 83 are connected by (via) a second charging path Cpb. The first battery Ba is charged by a charging current that flows through the first charging path Cpa, and the second battery Bb is charged by a charging current that flows through the second charging path Cpb.

The first and second charging paths Cpa, Cpb share (constitute) a single path (wire) from the main converter 83 to branch point Po, at which the first charging path Cpa and the second charging path Cpb branch and separately lead to the first positive-electrode-side terminal 91 and the positive-electrode terminal 93, respectively. A first switching element SWa and a first backfeed (reverse-current) prevention part 95 are provided in series in the first charging path Cpa between the branch point Po and the first positive-electrode-side terminal 91. In addition, a second switching element SWb and a second backfeed (reverse-current) prevention part 96 are provided in series in the second charging path Cpb between the branch point Po and the positive-electrode terminal 93.

The first and second switching elements SWa, SWb are preferably field-effect transistors (FETs) or the like. When the first and second switching elements SWa, SWb are in the ON state (i.e. the closed or conductive state), the first and second charging paths Cpa, Cpb are set to the connected state (i.e. are conductive). On the other hand, when the first and second switching elements SWa, SWb are in the OFF state (i.e. the open or non-conductive state), the first and second charging paths Cpa, Cpb are set to the disconnected state (i.e. are non-conductive). When the first battery Ba is to be charged, the control part 200 sets the first switching element SWa to the ON state and sets the second switching element SWb to the OFF state. On the other hand, when the second battery Bb is to be charged, the control part 200 sets the first switching element SWa to the OFF state and sets the second switching element SWb to the ON state. In addition, when neither of the battery packs (i.e. neither battery Ba nor battery Bb) are to be charged, the control part 200 sets both of the first and second switching elements SWa, SWb to the OFF state.

The first and second backfeed prevention parts 95, 96 are circuits that include a diode, etc., and prevent reverse currents from flowing from the first positive-electrode-side terminal 91 and the positive-electrode terminal 93 toward the branch point Po. Charging from the first battery Ba to the second battery Bb or from the second battery Bb to the first battery Ba is prevented by controlling (turning ON and OFF) the first and second switching elements SWa, SWb and by the backfeed prevention parts 95, 96.

In addition, the first positive-electrode-side terminal 91 is connected to an input terminal of the control part 200 via a cut-off circuit 97 and an attenuator 98. The positive-electrode-side sense terminal 94 is connected to an input terminal of the control part 200 via the cut-off circuit 97 and an attenuator 99. The cut-off circuit 97 comprises: a circuit that permits or cuts off electrical discharge (current flow) from the first positive-electrode-side terminal 91 to the attenuator 98; and a circuit that permits or cuts off electrical discharge (current flow) from the positive-electrode-side sense terminal 94 to the attenuator 99. The circuits of the cut-off circuit 97 permit electrical discharge only during charging of the battery packs connected to the circuits and cut off electrical discharge at other times such as when charging is complete or when charging is standing by.

When the cut-off circuit 97 permits electrical discharge from the first positive-electrode-side terminal 91 to the attenuator 98, the control part 200 receives the voltage value Va of the first battery Ba, which is applied (is the difference in electrical potential) between the first positive-electrode-side terminal 91 and the sense terminal 150, after it has been attenuated by the attenuator 98. In addition, when the cut-off circuit 97 permits electrical discharge from the positive-electrode-side sense terminal 94 to the attenuator 99, the control part 200 receives voltage value Vb of the second battery Bb, which is applied (is the difference in electrical potential) between the positive-electrode-side sense terminal 94 and the negative-electrode-side sense terminal 172, after it has been attenuated by one-third by the attenuator 99. That is, the control part 200 receives the voltage value Vb of three battery cells, after it has been attenuated (stepped down) to a voltage that corresponds to a single battery cell. In addition, the control part 200 receives, via an attenuator 81, the voltage value Vw of the power supply voltage between the branch point Po and ground. It is noted that the rated voltages of the first battery Ba and the second battery Bb are both 25V or less, and the voltage values Va, Vb are thus 25V or less.

Before starting the charging of the first battery Ba, the control part 200 uses the voltage value Vw to check for a malfunction in the first switching element SWa. In addition, before starting the charging of the second battery Bb, the control part 200 uses the voltage value Vw to check for a malfunction in the second switching element SWb. Representative, non-limiting processes for checking the first and second switching elements SWa, SWb are described below, with reference to FIGS. 15 and 16.

It is noted that, in the present exemplary, non-limiting embodiment of the present teachings, the second battery Bb does not comprise a voltage-detection circuit inside the battery pack, and the charger 5 is configured to detect the voltage of the second battery Bb. Consequently, to detect the voltage of the second battery Bb with high accuracy using the charger 5, the positive-electrode terminal 93 and the negative-electrode terminal 171 that supply the charging currents and the positive-electrode-side sense terminal 94 and the negative-electrode-side sense terminal 172 for detecting voltages are provided separately.

In addition, the control part 200 receives, via the first negative-electrode-side terminal 160 and a shunt resistor 88, the electric-current value of the charging current flowing to the first battery Ba and receives, via the negative-electrode terminal 171 and the shunt resistor 88, the electric-current value of the charging current flowing to the second battery Bb. Furthermore, the control part 200 obtains, via the communication terminal 140, digital data that represent the battery state of the first battery Ba. As the digital data that represent the battery state of the first battery Ba, the control part 200 acquires at least one of the following: (i) property data of the first battery Ba, (ii) the history (usage history) of the first battery Ba, (iii) the voltage value Va of the first battery Ba, (iv) the temperature value Ta of the first battery Ba, and/or (v) information indicating whether the temperature value Ta of the first battery Ba exceeds a temperature threshold Tth. The temperature threshold Tth is a predetermined value for the first battery Ba and is the upper-limit value of the temperature at which charging of the first battery Ba can be performed safely and without damaging the first battery Ba. Because the upper-limit value of the temperature at which charging can be performed changes (differs) depending on the type of battery pack, the temperature threshold Tth is individually determined for each type of battery pack. Furthermore, the control part 200 receives, via the second temperature-input terminal 120, the temperature value Tb of the second battery Bb.

The monitor circuit 125 detects voltage values Vc1, Vc2 of the battery cells of the second battery Bb and inputs the detected voltage values into the control part 200. The voltage-detection terminal 100 is connected between the high-electric-potential battery cell and the middle-electric-potential battery cell—from among the three series-connected battery cells—and detects the voltage value Vc1 of two battery cells, namely the middle-electric-potential battery cell and the low-electric-potential battery cell. In addition, the voltage-detection terminal 110 is connected between the middle-electric-potential battery cell and the low-electric-potential battery cell and detects the voltage value Vc2 of the single low-electric-potential battery cell.

As paths that input the voltage value Vc1 into the control part 200, the monitor circuit 125 comprises a first path A1, which transits an amplifier 105A and an attenuator 106, and a first path B1, which transits an amplifier 105B and the attenuator 106. In addition, the monitor circuit 125 comprises an analog switch 107 that connects either the first path A1 or the first path B1 to the control part 200. The operation of the analog switch 107 is controlled by the control part 200. When the analog switch 107 connects the first path A1 to the control part 200, then Vc1(A) is input into the control part 200 via the first path A1. On the other hand, when the analog switch 107 connects the first path B1 to the control part 200, then Vc1(B) is input into the control part 200 via the first path B1. It is noted that in both cases, i.e. in both the first path A1 and the first path B1, Vc1(A) and Vc1(B) are attenuated (stepped down) by one-half, and thereby a voltage (a voltage level) corresponding to a single battery cell is input into the control part 200. The control part 200 checks for a malfunction in the monitor circuit 125 by comparing Vc1(A) and Vc1(B), as will be described further below with reference to FIG. 17. The amplifiers 105A, 105B are constructed identically; therefore, when the monitor circuit 125 is operating normally, Vc1(A) and Vc1(B) should be, in principle, the same value.

Similarly, as paths that input the voltage value Vc2 into the control part 200, the monitor circuit 125 also comprises a second path A2 that transits an amplifier 115A and a second path B2 that transits an amplifier 115B. In addition, the monitor circuit 125 comprises an analog switch 117 that connects either the second path A2 or the second path B2 to the control part 200. Furthermore, the control part 200 also checks for a malfunction in the monitor circuit 125 by comparing Vc2(A) and Vc2(B), as will be described further below with reference to FIG. 17. Similar to the amplifiers 105A, 105B, the amplifiers 115A, 115B are constructed identically; therefore, when the monitor circuit 125 is operating normally, Vc2(A) and Vc2(B) should be, in principle, the same value.

In addition, although omitted in FIG. 13, resistors and switching elements, such as field-effect transistors, are connected in series between the input stages of the amplifiers 105A, 115A and ground. When the second battery Bb is not connected to the second connecting part 32, the input electric potentials of the amplifiers 105A, 115A become unstable, and consequently the switching elements connected to the input stages are (biased) set to the ON state so as to stabilize the input electric potentials of the amplifiers 105A, 115A to ground level. Control of the switching elements connected to the input stages is performed by the control part 200 in conjunction with control of the operation of the analog switches 107, 117.

On the secondary side, the charger 5 also comprises a TMa detection circuit 135 and a self-check circuit 133. The TMa detection circuit 135 is a protection circuit that bypasses the control part 200 and stops the charging of the first battery Ba in the event that a malfunction has occurred in the control part 200 (i.e. in case the control part 200 is no longer functioning properly). More particularly, the TMa detection circuit 135 obtains the temperature value Ta of the first battery Ba via the first temperature-input terminal 130. When the temperature value Ta is higher than a value computed by adding a prescribed value to the temperature threshold Tth, the TMa detection circuit 135 sets (biases) the first switching element SWa to the OFF state and thereby stops the charging of the first battery Ba, irrespective of the charging control performed by the control part 200.

The self-check circuit 133 is designed to check whether the TMa detection circuit 135 is malfunctioning. More particularly, to check whether the TMa detection circuit 135 is functioning properly, the control part 200 turns ON the first switching element SWa and also causes the self-check circuit 133 to output a value that is higher than the above-mentioned value (i.e. the value obtained by adding the prescribed value to the temperature threshold Tth) to the TMa detection circuit 135. When the TMa detection circuit 135 is operating properly, this value will cause the TMa detection circuit 135 to operate and output a signal that turns (biases) OFF the first switching element SWa. Therefore, when the self-check circuit 133, the TMa detection circuit 135, and the first switching element SWa are all operating normally and the self-check circuit 133 and the TMa detection circuit 135 are caused to operate, the first switching element SWa changes to the OFF state, despite the fact that the control part 200 has output a signal to cause the first switching element SWa to turn ON. In this case, the voltage value Vw becomes 25V or greater. On the other hand, when any one of the self-check circuit 133, the TMa detection circuit 135, and the switching element SWa is malfunctioning and the self-check circuit 133 and the TMa detection circuit 135 are caused to operate, the first switching element SWa does not change to the OFF state. In this case, the voltage value Vw becomes 25V or less. Using the detected voltage value Vw, the control part 200 makes a determination that the TMa detection circuit 135 and the switching element SWa are functioning normally when the voltage value Vw>25V and makes a determination that at least one of the TMa detection circuit 135 and the switching element SWa is functioning abnormally when the voltage value Vw≤25V.

The control part 200 detects the connections of the battery packs based on inputs from the first battery Ba and the second battery Bb and charges the battery packs based on the battery states of the battery packs. At this time, the control part 200 charges each battery pack, using a charging current suited to each battery pack, to a predetermined voltage for the particular battery pack (battery).

It is noted that the main converter 83 corresponds to one representative, non-limiting example of a "power supply circuit" according to this aspect of the present disclosure, and the first and second charging paths Cpa, Cpb correspond to one representative, non-limiting example of a "plurality of charging paths" according to this aspect of the present disclosure. In addition, the first and second switching elements SWa, SWb correspond to one representative, non-limiting example of an "open/close part" according to this aspect of the present disclosure, and the first and second backfeed prevention parts 95, 96 correspond to one representative, non-limiting example of a "backfeed prevention part" according to this aspect of the present disclosure. In addition, the control part 200 corresponds to one representative, non-limiting example of a "charging-control part" and a "diagnostic part" according to this aspect of the present disclosure.

3. Charging Process 3-1. Main Process

Figure 14A:
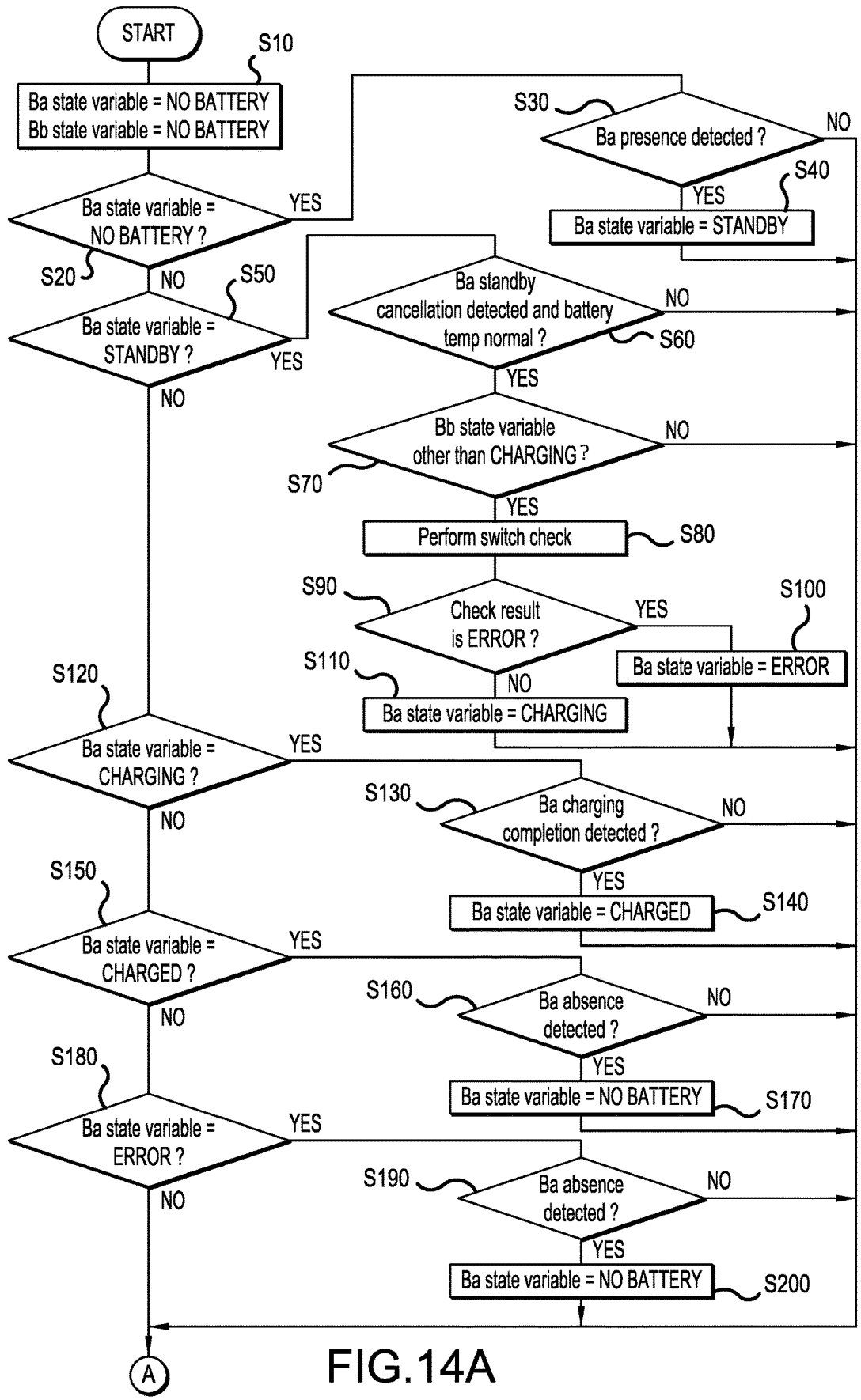
FIG. 14A is a flow chart that shows a process (algorithm) for charging the first battery and the second battery.
Figure 14B:
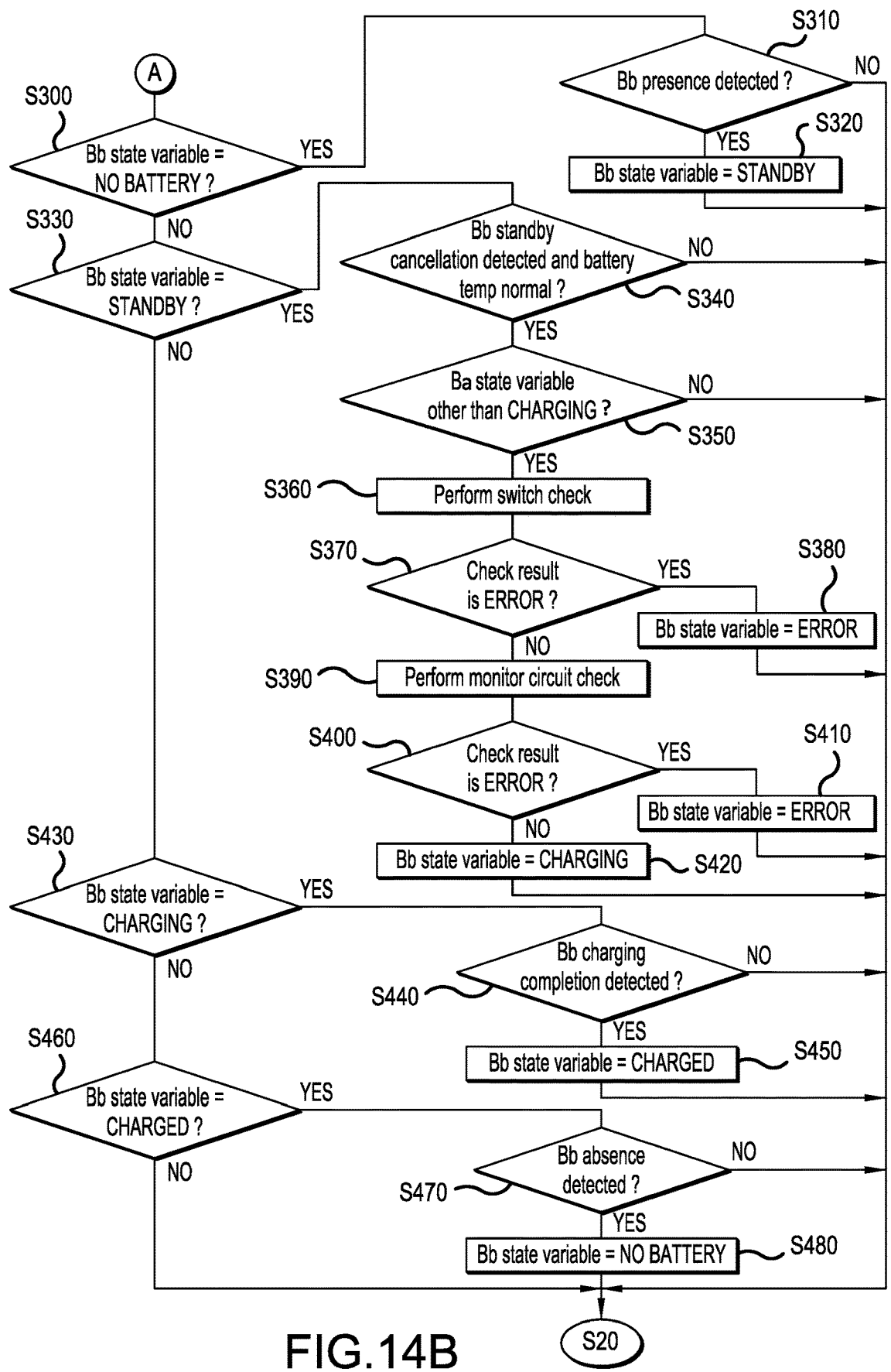
FIG. 14B is a flow chart that shows further steps of the process (algorithm) for charging the first battery and the second battery.

Next, a charging process (protocol, algorithm) of the charger 5 will be explained, with reference to FIGS. 14A and 14B. When the charger 5 is connected to an external power supply, the present charging process is performed by the control part 200. The process disclosed in FIGS. 14A and 14B includes, among other algorithms, a representative, non-limiting algorithm for setting (selecting) one of two connected battery packs Ba, Bb as the charging target.

First, in S10, the state variables of the first battery Ba and the second battery Bb are each set to "NO BATTERY" Next, in S20, it is determined whether the state variable (hereinbelow, "first state variable") of the first battery Ba is "NO BATTERY" If the first state variable is "NO BATTERY," then the "NO BATTERY" state is displayed by the first display part 315 and the process proceeds to S30; on the other hand, if the first state variable differs from "NO BATTERY," then the process proceeds to S50.

In S30, it is determined whether the connection of the first battery Ba has been detected. If the connection of the first battery Ba is not detected, then the process proceeds to S300. That is, the process transitions to the second battery Bb charging process. On the other hand, if the connection of the first battery Ba has been detected, then the process proceeds to S40, where the first state variable is set to "STANDBY" after which the process proceeds to S300.

In S50, it is determined whether the first state variable is "STANDBY" If the first state variable is "STANDBY," then the "STANDBY" state is displayed by the first display part 315 and the process proceeds to S60. On the other hand, if the first state variable differs from "STANDBY," then the process proceeds to S120.

In S60, it is determined whether the cancellation of the standby state of the first battery Ba is detected and whether the temperature value Ta of the first battery Ba is a normal-temperature value, which is a value equal to or below the temperature threshold Tth. If the standby state of the first battery Ba is not cancelled or if the temperature value Ta is not a normal-temperature value, then the process proceeds to S300; otherwise, the process transitions to the second battery Bb charging process. On the other hand, if the standby state of the first battery Ba is cancelled and the temperature value Ta is equal to or below the temperature threshold Tth, then the process proceeds to S70.

In S70, it is determined whether the state variable (hereinbelow, "second state variable") of the second battery Bb is other than "CHARGING." If the second state variable is "CHARGING," then the process proceeds to S300. On the other hand, if the second state variable is other than "CHARGING," then the process proceeds to S80.

In S80, a check is performed to determine whether either of the first and second switching elements SWa, SWb is malfunctioning. If (i) the STANDBY of the first battery Ba is cancelled, (ii) the temperature value Ta is a normal-temperature value and (iii) the second battery Bb is not CHARGING; then charging of the first battery Ba can be started. However, prior to starting the charging of the first battery Ba, the first and second switching elements SWa, SWb are checked for malfunctions in S80. A representative, non-limiting check process for the switching elements SWa, SWb is described below, with reference to FIGS. 15 and 16.

In S90, it is determined whether the check result of the first and second switching elements SWa, SWb is "ERROR" (i.e. whether there is a fault or malfunction in one of the first and second switching elements SWa, SWb). If the check result is "ERROR," then the process proceeds to S100, where the first state variable is set to "ERROR," after which the process proceeds to S300. On the other hand, if the check result is not "ERROR," then the process proceeds to S110, where the first state variable is set to "CHARGING" and the charging of the first battery Ba is started, after which the process proceeds to S300.

In addition, in S120, it is determined whether the first state variable is "CHARGING." If the first state variable is "CHARGING," then the "CHARGING" state is displayed by the first display part 315, and the process proceeds to S130. On the other hand, if the first state variable differs from "CHARGING," then the process proceeds to S150.

In S130, it is determined whether the completion of charging of the first battery Ba is detected. If the completion of charging is not detected, then the process proceeds to S300. On the other hand, if the completion of charging is detected, then the process proceeds to S140, where the first state variable is set to "CHARGED," after which the process proceeds to S300.

In addition, in S150, it is determined whether the first state variable is "CHARGED." If the first state variable is "CHARGED," then the "CHARGED" state is displayed by the first display part 315, and the process proceeds to S160. On the other hand, if the first state variable differs from "CHARGED," then the process proceeds to S180.

In S160, it is determined whether the removal (disconnection) of the first battery Ba is detected. If the removal of the first battery Ba is not detected, then the process proceeds to S300. On the other hand, if the removal of the first battery Ba is detected, then the process proceeds to S170, where the first state variable is set to "NO BATTERY," after which the process proceeds to S300.

In S180, it is determined whether the first state variable is "ERROR." If the first state variable is "ERROR," then the "ERROR" (malfunction) state is displayed by the first display part 315 and the process proceeds to S190. On the other hand, if the first state variable differs from "ERROR," then the process proceeds to S300.

In S190, it is determined whether the removal (disconnection) of the first battery Ba is detected. If the removal of the first battery Ba is not detected, then the process proceeds to S300. On the other hand, if the removal of the first battery Ba is detected, then the process proceeds to S200, where the first state variable is set to "NO BATTERY," after which the process proceeds to S300.

Next, in S300-S380, the same processing as in S20-S100 is performed, wherein the first battery Ba is substituted by the second battery Bb, the first state variable is substituted by the second state variable, and the first display part 315 is substituted by the second display part 325. However, instead of proceeding to S300, the process of S300-S380 then proceeds to S20. In addition, in S340, the predetermined temperature threshold Tth for the second battery Bb is used instead of the predetermined temperature threshold Tth for the first battery Ba. That is, these two predetermined temperature threshold values may differ from each other owing to differences, e.g., in the battery chemistry, the battery pack design, the usage history, etc., of the first and second batteries Ba, Bb.

If the check result in S370 is not "ERROR," then the process proceeds to S390, where a check is made for a malfunction of the monitor circuit 125. A representative, non-limiting check process for determining whether the monitor circuit 125 is malfunctioning is described below, with reference to FIG. 17.

In S400, it is determined whether the check result of the monitor circuit 125 is "ERROR." If the check result is "ERROR," then the process proceeds to S410, where the second state variable is set to "ERROR," after which the process proceeds to S20. On the other hand, if the check result is not "ERROR," then the process proceeds to S420, where the second state variable is set to "CHARGING" and the charging of the second battery Bb is started, after which the process returns to S20.

Next, in S430-S480, the same processing as in S120-S170 is performed, wherein the first battery Ba is substituted by the second battery Bb, the first state variable is substituted by the second state variable, and the first display part 315 is substituted by the second display part 325. However, instead of proceeding to S300, the process of S430-S480 then returns to S20.

According to the above-described process (protocol, algorithm), if the charger 5 is connected to the external power supply and then the first battery Ba and the second battery Bb are subsequently connected to the charger 5, then the battery pack that was first connected to the charger 5 is charged first (i.e. before the second-connected battery pack). On the other hand, according to the above-described process, if the first battery Ba and the second battery Bb are both connected to the charger 5 (when the charger 5 is not connected to the external power supply) and then the charger 5 is subsequently connected to the external power supply, then the first battery Ba is charged first (i.e. before the second battery Bb). However, in either situation, if the temperature value of the battery, which set (selected as the charging target) to be charged first, is determined to be greater than the temperature threshold Tth for that battery, that battery is set to the standby state, and the other battery is charged first (i.e. before the overheated battery is charged, so that the overheated battery can cool down while the other battery is being charged).

3-2. Check Process for Switching Elements

Figure 15:
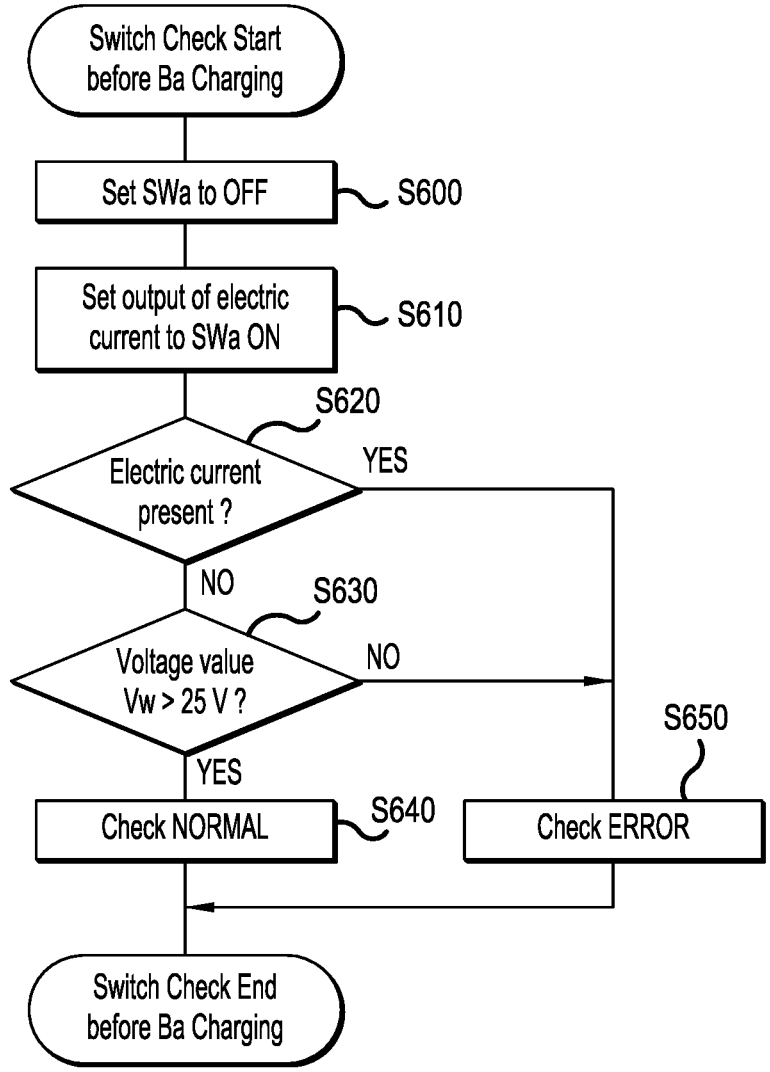
FIG. 15 is a flow chart that shows a process (algorithm) for checking a first switch prior to charging the first battery.

Next, a representative, non-limiting process (algorithm) that checks for malfunctions of the first and second switching elements SWa, SWb prior to starting the charging of the first battery Ba will be explained, with reference to FIG. 15. This check process is performed by the control part 200 in S80 of the charging process of the charger 5, as was mentioned above in the description concerning FIG. 14A.

First, in S600, the first switching element SWa is set to the OFF state. It is noted that the second switching element SWb is maintained in the OFF state throughout the process for checking the first switching element SWa.

Next, in S610, the output of electric current from the main converter 83 to the first switching element SWa is set to ON, and thereby electric current is supplied from the main converter 83 to the first switching element SWa.

Next, in S620, based on the electric-current value obtained via the shunt resistor 88, it is determined whether a charging current is flowing to at least one of the first battery Ba and the second battery Bb. If neither of the first or second switching elements SWa, SWb is short-circuited (i.e. is malfunctioning), then no charging current should be flowing to either of the first battery Ba or the second battery Bb while the first and second switching elements SWa and SWb are being maintained (biased) in their OFF (non-conducting) state. On the other hand, if at least one of the switching elements SWa, SWb is short-circuited (i.e. is malfunctioning), then a charging current will be flowing to at least one of first battery Ba and the second battery Bb even though both of the first and second switching elements SWa and SWb have been set (biased) to their OFF (non-conducting) state.

Therefore, if it is detected that a charging current is flowing to at least one of the first battery Ba and the second battery Bb, then the process proceeds to S650, where a determination of "ERROR" (fault or malfunction) is made and the process terminates. On the other hand, if no charging current is detected at this time, then the process proceeds to S630 because the first and second switching elements SWa and SWb are functioning properly.

In S630, it is determined whether the voltage value Vw of the power supply voltage on the main converter 83 side of the branch point Po is 25V or greater. (As was noted above, the voltage value Vw of the output of the main converter 83 is at least 25V in the present embodiment and the voltage value Vw is determined by the control part 200 based upon the voltage input thereto from the attenuator 81.) When both of the first and second switching elements SWa, SWb are set to OFF and neither of the first and second switching elements SWa, SWb is short-circuited (malfunctioning), the voltage value Vw should be 25V or greater. On the other hand, if at least one of the switching elements SWa, SWb is short-circuited (malfunctioning), then the voltage value Vw becomes substantially equal to the voltage value Va, which is the voltage value across the terminals of the first battery Ba (e.g., equal to or less than 14.4V or 18V in the present embodiment), or the voltage value Vb, which is the voltage value across the terminals of the second battery Bb (e.g., equal to or less than 10.8V in the present embodiment). That is, if at least one of the first and second switching elements SWa, SWb is short-circuited (malfunctioning), then the voltage value Vw becomes less than 25V.

Therefore, if the voltage value Vw is 25V or greater, then the process proceeds to S640, where a determination of "NORMAL" is made and this check process is terminated. On the other hand, if the voltage value Vw is 25V or less, then the process proceeds to S650, where a determination of "ERROR" (fault or malfunction) is made and this check process is terminated.

Figure 16:
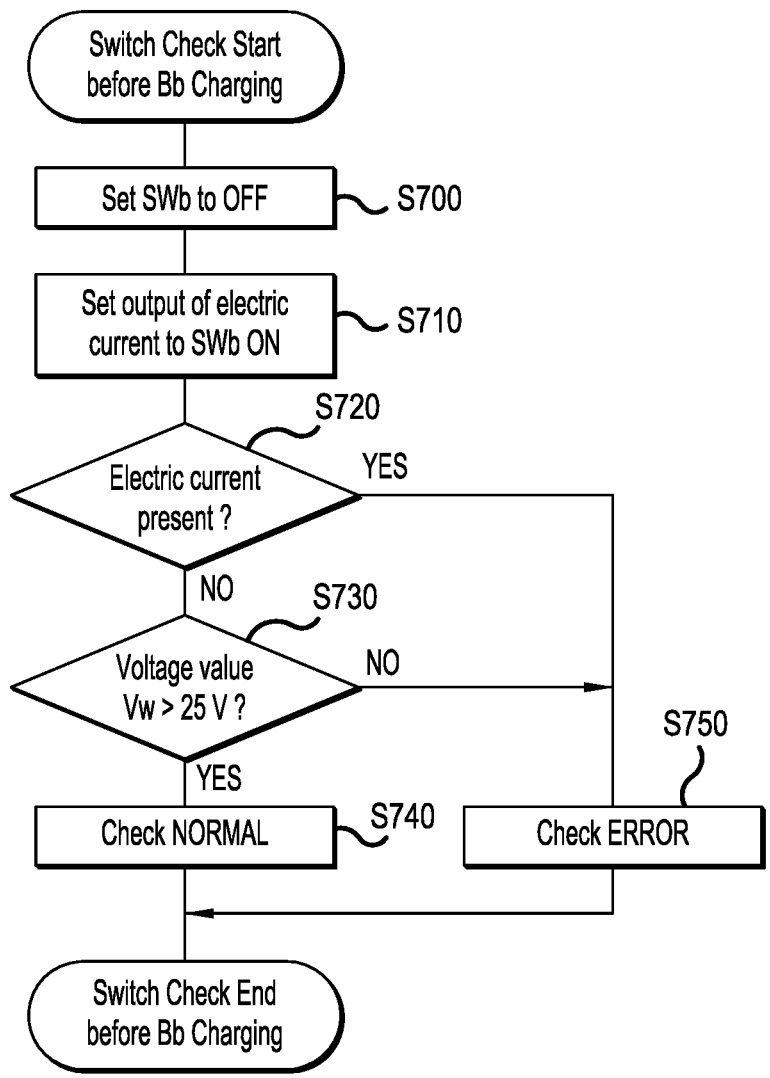
FIG. 16 is a flow chart that shows a process (algorithm) for checking a second switch prior to charging the second battery.

FIG. 16 shows a flow chart of a representative, non-limiting process for checking whether either of the first or second switching elements SWa, SWb is malfunctioning (short-circuited) prior to charging the second battery Bb. This check process is performed by the control part 200 in S360 of the charging process of the charger 5, as was mentioned above in the description concerning FIG. 14B. Because S700-S750 of the present process perform substantially the same processing as S600-S650, it is not necessary to provide a detailed explanation of S700-S750.

3-3. Check Process for Monitor Circuit

Figure 17:
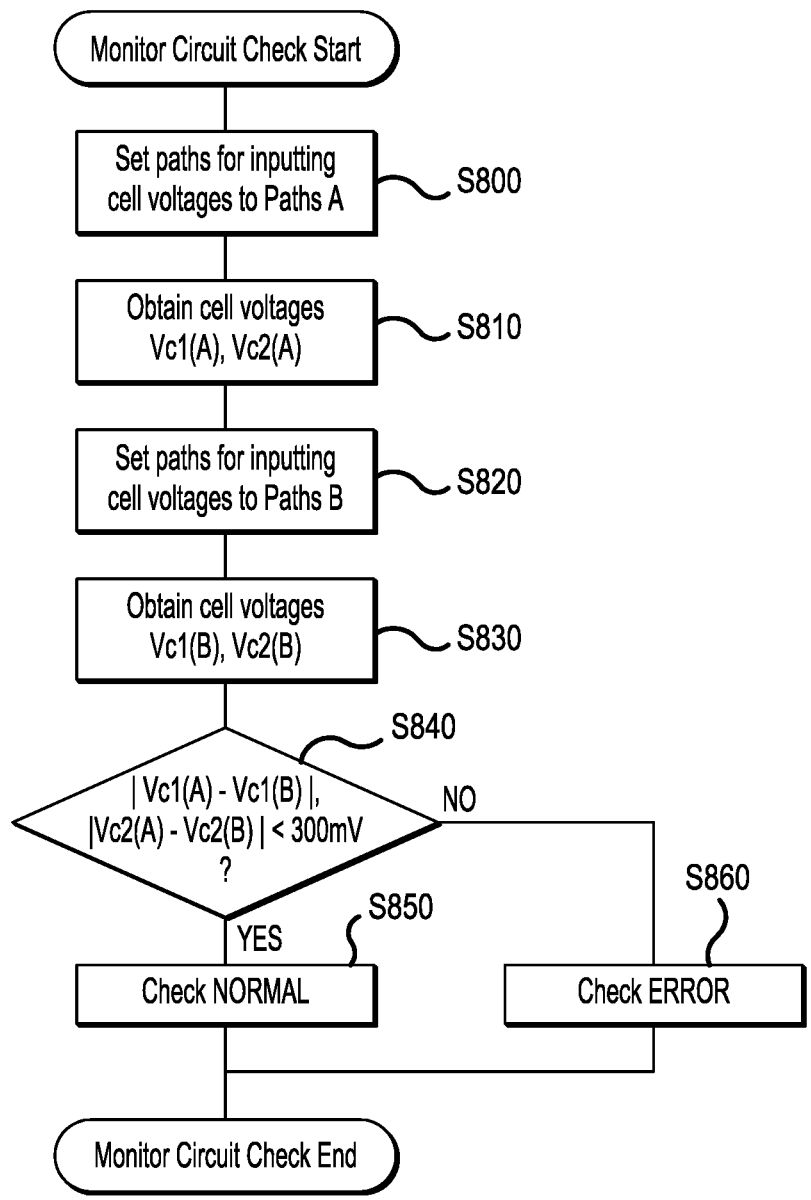
FIG. 17 is a flow chart that shows a process (algorithm) for checking a monitor circuit (voltage monitor circuit) that monitors cell voltages of the second battery.

Next, a process (algorithm) that checks the monitor circuit (voltage monitor) 125 for malfunctions prior to charging the second battery Bb will be explained, with reference to FIG. 17. The present process is performed by the control part 200 in S390 of the charging process of the charger 5, as was mentioned above in the description concerning FIG. 14B.

First, in S800, the path that inputs the cell voltage Vc1 from the voltage-detection terminal 100 to the control part 200 is set to the above-described first path A1 and the path that inputs the cell voltage Vc2 from the voltage-detection terminal 110 to the control part 200 is set to the second path A2. Then, in S810, the cell voltage Vc1(A) and the cell voltage Vc2(A) are obtained by the control part 200 via the first and second paths A1, A2 set in S800.

Next, in S820, the path that inputs the cell voltage Vc1 from the voltage-detection terminal 100 to the control part 200 is set to the above-described first path B1 and the path that inputs the cell voltage Vc2 from the voltage-detection terminal 110 to the control part 200 are set to the above-described second path B2. Then, in S830, the cell voltage Vc1(B) and the cell voltage Vc2(B) are obtained by the control part 200 via the first and second paths B1, B2 set in S820.

Next, both |Vc1(A)−Vc1(B)|=ΔVc1 and |Vc2(A)−Vc2(B)|=ΔVc2 are calculated and it is determined whether both ΔVc1 and ΔVc2 are less than 300 mV. When the monitor circuit 125 is operating normally, Vc1(A) and Vc1(B) will be at least substantially equal values (i.e. ΔVc1 will be zero or nearly zero), and Vc2(A) and Vc2(B) also will be at least substantially equal values (i.e. ΔVc2 also will be zero or nearly zero). On the other hand, if the monitor circuit 125 is malfunctioning, then Vc1(A) and Vc1(B) will be significantly (e.g., greatly) different values, and Vc2(A) and Vc2(B) also will be significantly (e.g., greatly) different values. In this embodiment, a "significantly different value" of ΔVc1 and ΔVc2 is 300 mV or more, although the "significant different value" could be set to a different predetermined voltage difference in other embodiments of the present teachings.

Therefore, if both ΔVc1 and ΔVc2 are less than 300 mV, that is, if Vc1(A) and Vc1(B) are at least substantially equal and Vc2(A) and Vc2(B) are at least substantially equal, then the process proceeds to S850, where a determination of "NORMAL" is made and the process is terminated. On the other hand, if at least one of ΔVc1 and ΔVc2 is 300 mV or greater, then the process proceeds to S860, where a determination of "ERROR" (fault or malfunction) is made and the process is terminated. That is, if the voltage monitoring circuit 125 is not operating properly, then accurate battery voltages Vc1 and Vc2 from the second battery Bb will not be input to the control part 200 of the charger 5, and thus charging of the second battery Bb can not be safely performed. Therefore, charging of the second battery Bb should be prevented, e.g., until the voltage monitoring circuit 125 is repaired.

4. Effects and Advantages

The following effects and advantages can be obtained with the above-described embodiment.

(1) The charger 5 comprises the first connecting part 31 and the second connecting part 32, which correspond (are complementary) to the differing mounting parts 11, 21 of the two different types of batteries Ba, Bb. Therefore, the charger 5 can be connected to the first battery Ba, which comprises the mounting part 11, and also to the second battery Bb, which comprises the mounting part 21. Furthermore, by controlling the ON/OFF states of the first and second switching elements SWa, SWb, the first battery Ba and the second battery Bb can be sequentially charged one at a time. That is, the first battery Ba and the second battery Bb can be both charged by the single charger 5.

(2) Because the charger 5 is configured such that both the first battery Ba and the second battery Bb can be charged using one main converter 83, the charger 5 can be made compact.

(3) For the battery pack connected to the charger 5 that is not set (selected) as the charging target, a backfeed (reverse flow) of electric current from that battery pack to the branch point Po is prevented by the first switching element SWa or the second switching element SWb being in the open state and by the backfeed prevention part 95 and the backfeed prevention part 96. Therefore, by providing the backfeed prevention parts 95, 96 in addition to the first and second switching elements SWa, SWb, safety during a charging operation can be further enhanced.

(4) By checking for a malfunction of the first and second switching elements SWa, SWb prior to the start of charging, safety can be further enhanced because charging can be discontinued if either of the first or second switching elements SWa, SWb is malfunctioning.

(5) If either the temperature value Ta of the first battery Ba or the temperature value Tb of the second battery Bb exceeds its predetermined temperature threshold Tth, the overheated battery pack is set to the standby state until its temperature value falls below its temperature threshold Tth. While the overheated battery pack is cooling, the other battery pack (whose temperature is less than its predetermined temperature threshold) is charged first. A plurality of battery packs can thereby be charged in an efficient and safe manner.

(6) By mating the mating holes 42 of the mounting parts 41 with the projections F provided on a wall W, the charger 5 can be mounted and used on the wall W. Furthermore, because the mounting parts 41, in which the mating holes 42 are formed, are provided (designed) such that they project from the rear surface 410 of the case 50, the projections F do not penetrate (extend into) the interior of the case 50, unlike an embodiment in which if the mating holes 42 are formed in the rear surface 410 of the case 50. Consequently, the space inside the case 50 can be utilized effectively and can house the circuit board 45.

OTHER EMBODIMENTS

Although a representative, non-limiting embodiment of the present disclosure was explained above, the present invention is not limited to the embodiment described above, and it can be implemented with various modifications.

(a) In the above-described embodiment, the first battery Ba and the second battery Bb are respectively mounted on the first connecting part 31 and the second connecting part 32 by sliding both of them from above to below, but the present invention is not limited thereto. For example, the charger 5 may be configured such that one or both of the first connecting part 31 and the second connecting part 32 are provided on the charger 5 oriented upside down to the arrangement in the above-described embodiment. In this alternate embodiment, one or both of the first battery Ba and the second battery Bb are respectively mounted on the first connecting part 31 and the second connecting part 32 by being slid from below to above. In addition, the first connecting part 31 and the second connecting part 32 may be provided on the front surface 330 of the charger 5 such that the rail parts 311, 321 are disposed in the left-right direction.

Furthermore, the charger 5 may be configured such that both the first battery Ba and the second battery Bb are respectively mounted on the first connecting part 31 and the second connecting part 32 by being slid from the left to the right or from the right to the left. Alternatively, the charger 5 may be configured such that the first battery Ba and the second battery Bb are respectively mounted on the first connecting part 31 and the second connecting part 32 by one of them being slid from the left to the right and the other being slid from the right to the left. Furthermore, the charger 5 may be configured such that the first battery Ba and the second battery Bb are respectively mounted on the first connecting part 31 and the second connecting part 32 by one of them being slid from above to below or from below to above and the other being slid from the left to the right or from the right to the left.

(b) In the above-described embodiment, the first battery Ba comprises a control circuit in its interior, whereas the second battery Bb does not comprise a control circuit in its interior. However, in other embodiments of the present teachings, both the first battery Ba and the second battery Bb may comprise a control circuit, or neither the first battery Ba nor the second battery Bb may comprise a control circuit.

(c) In the above-described embodiment, the charger 5 comprises two connecting parts (charging ports), namely the first connecting part 31 and the second connecting part 32. However, the number of connecting parts is not limited to two, and three or more of the connecting parts may be provided. If the charger 5 comprises three or more connecting parts, they do not necessarily all have to support differing types of mounting parts but should support at least two different types of mounting parts. For example, if the charger 5 comprises three connecting parts, two of the connecting parts may support (be compatible/complementary with) the same type of mounting part and one of connecting parts may support (be compatible/complementary with) a type of mounting part that differs from the other two.

(d) In the above-described embodiment, although the charger 5 comprises the mounting parts 41 for mounting the charger 5 on the mounting surface, the charger 5 need not comprise the mounting parts 41. If the charger 5 does not comprise the mounting parts 41, then the charger 5 may be used by being placed on a bench or the like.

(e) In the above-described embodiment, a plurality of functions having one structural element may be implemented by a plurality of structural elements, a single function having one structural element may be implemented by a plurality of structural elements, or the like. In addition, a plurality of functions having a plurality of structural elements may be implemented by one structural element, one function implemented by a plurality of structural elements may be implemented by one structural element, or the like. In addition, some of the structural elements of the above-described embodiment may be omitted. In addition, at least some of the structural elements of the above-described embodiment may be added to or substituted for the structural elements of the abovementioned other embodiments. It is noted that every aspect included in the technical concepts specified by the text of the claims alone are embodiments of the present invention.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved chargers.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

Although some aspects of the present disclosure have been described in the context of a device, it is to be understood that these aspects also represent a description of a corresponding method, so that each block or component of a device, such as the control part 200, is also understood as a corresponding method step or as a feature of a method step. In an analogous manner, aspects which have been described in the context of or as a method step also represent a description of a corresponding block or detail or feature of a corresponding device, such as the control part 200.

Depending on certain implementation requirements, exemplary embodiments of the control part 200 of the present disclosure may be implemented in hardware and/or in software. The implementation can be configured using a digital storage medium, for example one or more of a ROM, a PROM, an EPROM, an EEPROM or a flash memory, on which electronically readable control signals (program code) are stored, which interact or can interact with a programmable hardware component such that the respective method is performed.

A programmable hardware component can be formed by a processor, a computer processor (CPU=central processing unit), an application-specific integrated circuit (ASIC), an integrated circuit (IC), a computer, a system-on-a-chip (SOC), a programmable logic element, or a field programmable gate array (FGPA) including a microprocessor.

The digital storage medium can therefore be machine- or computer readable. Some exemplary embodiments thus comprise a data carrier or non-transient computer readable medium which includes electronically readable control signals which are capable of interacting with a programmable computer system or a programmable hardware component such that one of the methods described herein is performed. An exemplary embodiment is thus a data carrier (or a digital storage medium or a non-transient computer-readable medium) on which the program for performing one of the methods described herein is recorded.

In general, exemplary embodiments of the present disclosure, in particular the control part 200, are implemented as a program, firmware, computer program, or computer program product including a program, or as data, wherein the program code or the data is operative to perform one of the methods if the program runs on a processor or a programmable hardware component. The program code or the data can for example also be stored on a machine-readable carrier or data carrier. The program code or the data can be, among other things, source code, machine code, bytecode or another intermediate code.

A program according to an exemplary embodiment can implement one of the methods during its performing, for example, such that the program reads storage locations or writes one or more data elements into these storage locations, wherein switching operations or other operations are induced in transistor structures, in amplifier structures, or in other electrical, optical, magnetic components, or components based on another functional principle. Correspondingly, data, values, sensor values, or other program information can be captured, determined, or measured by reading a storage location. By reading one or more storage locations, a program can therefore capture, determine or measure sizes, values, variable, and other information, as well as cause, induce, or perform an action by writing in one or more storage locations, as well as control other apparatuses, machines, and components, and thus for example also perform complex processes with the batteries Ba, Bb.

Therefore, although some aspects of the control part 200 have been identified as "parts" or "steps", it is understood that such parts or steps need not be physically separate or distinct electrical components, but rather may be different blocks of program code that are executed by the same hardware component, e.g., one or more microprocessors.

EXPLANATION OF THE REFERENCE NUMBERS

5 Charger
7 Base member
11, 21 Mounting parts
31 First connecting part
32 Second connecting part
38 Rib
39 Relay connector
41 Mounting part
42 Mating hole
45 Circuit board
50 Case
71, 72 Insulating parts
83 Main converter
95, 96 Backfeed prevention parts
120 Second temperature-input terminal
125 Monitor circuit
200 Control part
330 Front surface
410 Rear surface
451 Sub-circuit board
452 Connector
453 Insulating spacer
458 Shield board
Ba First battery
Bb Second battery
Cpa, Cpb Charging paths
F Projection
Po Branch point
SWa, SWb Switching elements
W Wall

The invention claimed is:

1. A charger comprising:
a plurality of connecting parts configured such that at least two slide-type batteries having differing mounting parts are respectively mountable on the plurality of connecting parts;
one power supply circuit that generates charging power from input electric power;
a plurality of charging paths that respectively connect the power supply circuit to the plurality of connecting parts;
a plurality of open/close parts respectively provided in the plurality of charging paths, each open/close part being configured such that, in a closed state, the respective charging path is set to a connected state, and in an open state, the respective charging path is set to a disconnected state; and
a charging-control part configured such that:
a battery connected to one of the plurality of connecting parts serves as the charging target,
the open/close part, from among the plurality of open/close parts, provided in the charging path, which is connected to the charging target via the connecting part, is set to the closed state, and
the charging target is charged to a predetermined voltage by a charging current that is suited for the charging target,
wherein the plurality of connecting parts are located on a single planar surface or on a plurality of mutually planar surfaces.

2. The charger according to claim 1, further comprising:
a branch point at which the plurality of charging paths respectively branch to the plurality of open/close parts; and
a plurality of backfeed prevention parts respectively provided in the plurality of charging paths between the plurality of connecting parts and the branch point, the backfeed prevention parts being configured to prevent backfeeding of electric current from the connecting parts to the branch point.

3. The charger according to claim 2, wherein each of the backfeed prevention parts comprises a diode arranged to block current flow in the direction from the respective connecting part to the branch point.

4. The charger according to claim 1, further comprising:
a diagnostic part configured to diagnose the plurality of open/close parts prior to starting the charging of the charging target by the charging-control part.

5. A charger comprising:
a plurality of connecting parts configured such that at least two slide-type batteries having differing mounting parts are respectively mountable on the plurality of connecting parts;
one power supply circuit that generates charging power from input electric power;
a plurality of charging paths that respectively connect the power supply circuit to the plurality of connecting parts;
a plurality of open/close parts respectively provided in the plurality of charging paths, each open/close part being configured such that, in a closed state, the respective charging path is set to a connected state, and in an open state, the respective charging path is set to a disconnected state; and
a charging-control part configured such that:
a battery connected to one of the plurality of connecting parts serves as the charging target,
the open/close part, from among the plurality of open/close parts, provided in the charging path, which is connected to the charging target via the connecting part, is set to the closed state, and the charging target is charged to a predetermined voltage by a charging current that is suited for the charging target,
wherein the charging-control part is configured such that:
if at least two of the batteries are respectively connected to at least two of the connecting parts and the battery temperature of one of the connected batteries exceeds a predetermined temperature threshold for that battery, then the battery whose battery temperature exceeds its temperature threshold is set to a standby state, and the other battery is charged first.

6. The charger according to claim 1, further comprising:
a case that houses the power supply circuit, the plurality of charging paths, the plurality of open/close parts, and the charging-control part, the connecting parts being provided on one surface of the case;
wherein the case comprises at least one mounting part provided such that it projects from a surface that differs from the surface on which the connecting parts are provided; and
a mating hole adapted to mate with a projection provided on a mounting surface, on which the charger is mountable, is formed in the mounting part.

7. The charger according to claim 1, wherein each of the open/close parts comprises a field-effect transistor.

8. The charger according to claim 1, wherein:
the connecting parts each comprise a pair of rail parts configured to slidably engage corresponding slide rails on the mounting parts of the batteries; and
the rail parts of one of the connecting parts are spaced farther apart than the rail parts of the other of the connecting parts.

9. The charger according to claim 1, wherein the predetermined voltage of one of the batteries is higher than the predetermined voltage of the other of the batteries.

10. The charger according to claim 3, further comprising:
a diagnostic part configured to diagnose the plurality of open/close parts prior to starting the charging of the charging target by the charging-control part;
wherein:
each of the open/close parts comprises a field-effect transistor, the connecting parts each comprise a pair of rail parts configured to slidably engage corresponding slide rails on the mounting parts of the batteries;
the rail parts of one of the connecting parts are spaced farther apart than the rail parts of the other of the connecting parts;
the predetermined voltage of one of the batteries is higher than the predetermined voltage of the other of the batteries and
the charging-control part is configured such that:
if at least two of the batteries are respectively connected to at least two of the connecting parts and the battery temperature of one of the connected batteries exceeds a predetermined temperature threshold for that battery, then the battery whose battery temperature exceeds its temperature threshold is set to a standby state, and the other battery is charged first.

11. A charger comprising:
a first charging port configured to physically and electrically connect to a first mounting part of a first slide-mountable battery pack;
a second charging port configured to physically and electrically connect to a second mounting part of a second slide-mountable battery pack, the second charging port differing from the first charging port such that the first slide-mountable battery pack is not mountable on the second charging port and the second slide-mountable battery pack is not mountable on the first charging port;
a single power supply circuit configured to be electrically connected to an external power supply;
a first charging path connecting the power supply circuit to the first charging port;
a second charging path connecting the power supply circuit to the second charging port;
a first switch provided in the first charging path and being configured to selectively connect and disconnect the power supply circuit to/from the first charging port;
a second switch provided in the second charging path and being configured to selectively connect and disconnect the power supply circuit to/from the second charging port; and
a controller comprising a non-transitory computer readable memory medium that stores instructions and a processor configured to read the instructions stored in the non-transitory computer readable memory medium and to execute the instructions in order to control operation of the charger, wherein the instructions, when executed, cause the processor to:
select one of the first battery pack and the second battery pack as a first charging target when the first mounting part is physically and electrically connected to the first charging port, and the second mounting part is physically and electrically connected to the second charging port,
close the one of the first switch and the second switch in the first charging path or the second charging path that connects the power supply circuit to the first charging port or the second charging port that is connected to the first charging target,
open the other of the first switch and the second switch in the first charging path or the second charging path that connects the power supply circuit to the first charging port or the second charging port that is not connected to the first charging target,
supply a charging current, which is generated by the single power source circuit and is suited for charging the first charging target, to the first charging target until the first charging target is charged to a first predetermined voltage,
terminate the charging of the first charging target when the first charging target has been charged to the first predetermined voltage,
select the other of the first battery pack and the second battery pack, which was not charged to the predetermined voltage, as a second charging target,
close one of the first switch and the second switch in the first charging path or the second charging path that connects the power supply circuit to the first charging port or the second charging port that is connected to the second charging target,
open the other of the first switch and the second switch in the first charging path or the second charging path that connects the power supply circuit to the first charging port or the second charging port that is connected to the first charging target,
supply the charging current, which is generated by the single power source circuit and is suited for charging the second charging target, to the second charging target until the second charging target is charged to a second predetermined voltage that differs from the first predetermined voltage, and terminate the charging of the second charging target when the second charging target has been charged to the second predetermined voltage.

12. The charger according to claim 11, further comprising:
a branch point at which the first and second charging paths respectively branch from the power supply circuit to the first and second switches;
a first backfeed prevention part provided in the first charging path between the branch point and the first charging port; and
a second backfeed prevention part provided in the second charging path between the branch point and the second charging port;
wherein the first and second backfeed prevention parts are configured to respectively block current flow from the first and second charging ports to the branch point.

13. The charger according to claim 12, wherein each of the backfeed prevention parts comprises a diode.

14. The charger according to claim 13, wherein the first and second switches each comprise a field-effect transistor.

15. The charger according to claim 14, wherein the predetermined voltage of the first slide-mountable battery pack is higher than the predetermined voltage of the second slide-mountable battery pack.

16. The charger according to claim 15, wherein:
the first charging port comprises a first pair of rail parts configured to slidably engage corresponding slide rails on the first mounting part of the first slide-mountable battery pack;
the second charging port comprises a second pair of rail parts configured to slidably engage corresponding slide rails on the second mounting part of the second slide-mountable battery pack; and
the first rail parts are spaced farther apart than the second rail parts.

17. The charger according to claim 16, wherein the instructions further comprise instructions that cause, when executed, the processor to determine whether the first and second switches are malfunctioning prior to starting the charging of the charging target.

18. The charger according to claim 17, wherein the instructions further comprise instructions that cause, when executed, the processor to:
determine whether a battery temperature of the first battery pack exceeds a first predetermined temperature threshold for the first battery pack,
determine whether a battery temperature of the second battery pack exceeds a second predetermined temperature threshold for the second battery pack,
set the first battery pack to a standby state when the battery temperature of the first battery pack is determined to exceed the first predetermined temperature threshold for the first battery pack;
set the second battery pack to the standby state when the battery temperature of the second battery pack is determined to exceed the second predetermined temperature threshold for the second battery pack; and
when one of the first battery pack and the second battery pack is in the standby state and the other of the first battery pack and the second battery pack is not in the standby state, set the other of the first battery pack and the second battery pack that is not in the standby state as the charging target.

19. The charger according to claim 18, further comprising:
a case that houses the power supply circuit, the first and second charging paths, the first and second switches, and the controller, the first and second charging ports being provided on a first surface of the case;
wherein the case comprises at least one mounting part provided such that it projects from a second surface of the case that differs from the first surface; and
a mating hole configured to mate with a projection provided on a mounting surface, on which the charger is mountable, is formed in the mounting part.

20. A method for charging two battery packs having differing mounting parts using a single charger, comprising:
physically and electrically connecting a first mounting part of a first slide-mountable battery pack to a first charging port of the charger;
physically and electrically connecting a second mounting part of a second slide-mountable battery pack to a second charging port of the charger, the second charging port differing from the first charging port such that the first slide-mountable battery pack is not mountable on the second charging port and the second slide-mountable battery pack is not mountable on the first charging port;
selecting one of the first battery pack and the second battery pack as a first charging target,
closing a first switch in a first charging path that connects a power supply circuit to the one of the first charging port or the second charging port that is connected to the first charging target,
opening a second switch in a second charging path that connects the power supply circuit to the other of the first charging port or the second charging port that is not connected to the first charging target,
using the power supply circuit, generating a charging current that is suited for charging the first charging target,
supplying the charging current to the first charging target to charge the first charging target,
terminating the charging of the first charging target when the first charging target has been charged to a first predetermined voltage,
selecting the other of the first battery pack and the second battery pack, which was not charged to the predetermined voltage, as a second charging target,
closing the second switch in the second charging path that connects the power supply circuit to the one of the first charging port or the second charging port that is connected to the second charging target,
opening the first switch in the first charging path that connects the power supply circuit to the other of the first charging port or the second charging port that is connected to the first charging target,
using the power supply circuit, generating a charging current that is suited for charging the second charging target,
supplying the charging current to the second charging target to charge the second charging target, and
terminating the charging of the second charging target when the second charging target has been charged to a second predetermined voltage that differs from the first predetermined voltage.

21. The charger according to claim 1, wherein:
the connecting parts each comprise a pair of rail parts configured to slidably engage corresponding slide rails on the mounting parts of the batteries; and
the rail parts of each of the connecting parts are provided along the first planar surface or along the plurality of mutually planar surfaces.

22. The charger according to claim 1, wherein:
the at least two slide-type batteries each comprise a latching hook extending in a direction perpendicular to a slide direction of the batteries, and
the plurality of connecting parts each comprise a mating groove that extends in the direction perpendicular to the slide direction of the batteries and mates with the latching hook.

23. The charger according to claim 22, wherein the mating groove of each of the plurality of connecting parts is shaped differently from each other.

24. The charger according to claim 1, wherein the plurality of connecting parts comprises:
a first connecting part and a second connecting part;
a communication terminal provided to the first connecting part, the communication terminal being configured such that data of a voltage value of one of the batteries connected to the first connecting part is inputted to the communication terminal; and
a voltage monitor circuit provided to the second connecting part, the voltage monitor circuit being configured to detect a voltage value of the other of the batteries connected to the second connecting part.

* * * * *